(12) United States Patent
Carlson

(10) Patent No.: US 12,409,879 B2
(45) Date of Patent: *Sep. 9, 2025

(54) VEHICLE STEERING ASSEMBLY

(71) Applicant: Great Plains Manufacturing, Inc., Salina, KS (US)

(72) Inventor: Jason Carlson, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,839

(22) Filed: Sep. 8, 2023

(65) Prior Publication Data

US 2023/0415808 A1     Dec. 28, 2023

Related U.S. Application Data

(63) Continuation-in-part of application No. 17/721,544, filed on Apr. 15, 2022, now Pat. No. 11,787,462, which is a continuation of application No. 16/540,520, filed on Aug. 14, 2019, now Pat. No. 11,305,806.

(60) Provisional application No. 62/718,801, filed on Aug. 14, 2018.

(51) Int. Cl.
*B62D 1/12* (2006.01)
*B60K 26/02* (2006.01)
(Continued)

(52) U.S. Cl.
CPC ................ *B62D 1/12* (2013.01); *B60K 26/02* (2013.01); *B62D 11/001* (2013.01); *B62D 11/02* (2013.01); *E02F 3/422* (2013.01); *E02F 9/02* (2013.01); *E02F 9/2004* (2013.01); *E02F 9/2087* (2013.01); *E02F 9/225* (2013.01); *E02F 9/2253* (2013.01); *G05G 5/02* (2013.01); *G05G 5/04* (2013.01); *G05G 5/05* (2013.01);
(Continued)

(58) Field of Classification Search
CPC .. G05G 9/047; G05G 25/04; F16H 2059/026; F16H 2059/0256; F16H 59/0213; B62D 1/12
USPC .......................................................... 74/491
See application file for complete search history.

(56) References Cited

U.S. PATENT DOCUMENTS 4,111,066 A    9/1978  Kendrick
4,559,844 A    12/1985 Mor
(Continued)

*Primary Examiner* — Jake Cook
(74) *Attorney, Agent, or Firm* — Hovey Williams LLP; Kameron D. Kelly

(57) ABSTRACT

A vehicle steering assembly for controlling movement of a vehicle having independently rotatable left and right ground-engaging traction elements. The steering assembly comprises a steering handle and a steering controller positioned generally below the steering handle and actuated by movement of the steering handle. The steering handle includes an upright shaft and a laterally-extending crossmember fixed to the top of the upright shaft. A flexible protective cover is attached to the shaft and is configured to prevent dirt and debris from entering the steering controller. The steering handle is shiftable in forward and rearward directions to thereby cause corresponding forward and rearward rotation of both of the left and right traction elements. The steering handle is rotatable in clockwise and counterclockwise directions to thereby cause a change in the relative speeds and directions of rotation of the left and right traction elements.

19 Claims, 28 Drawing Sheets

(51) Int. Cl.
  *B62D 11/00* (2006.01)
  *B62D 11/02* (2006.01)
  *E02F 3/34* (2006.01)
  *E02F 3/42* (2006.01)
  *E02F 3/96* (2006.01)
  *E02F 9/02* (2006.01)
  *E02F 9/20* (2006.01)
  *E02F 9/22* (2006.01)
  *G05G 5/02* (2006.01)
  *G05G 5/04* (2006.01)
  *G05G 5/05* (2006.01)
  *G05G 9/00* (2006.01)

(52) U.S. Cl.
  CPC .............. *G05G 9/00* (2013.01); *E02F 3/3414* (2013.01); *E02F 3/96* (2013.01); *E02F 9/2285* (2013.01); *G05G 2505/00* (2013.01)

(56) References Cited

U.S. PATENT DOCUMENTS

| | | | |
|---|---|---|---|
| 5,160,918 A | 11/1992 | Saposnik et al. | |
| 5,597,261 A * | 1/1997 | Hayashi | F16D 3/04 403/291 |
| 6,328,127 B1 | 12/2001 | Hori et al. | |
| 6,460,640 B1 | 10/2002 | Keagle et al. | |
| 6,550,562 B2 | 4/2003 | Brandt et al. | |
| 6,655,229 B2 | 12/2003 | Yamamoto et al. | |
| 6,695,568 B2 | 2/2004 | Bares et al. | |
| 6,709,223 B2 | 3/2004 | Walto et al. | |
| 6,817,261 B2 * | 11/2004 | Mototani | G05G 13/00 74/471 XY |
| 6,902,016 B2 | 6/2005 | Bares et al. | |
| 6,992,602 B2 * | 1/2006 | Alexander | G05G 9/047 318/560 |
| 7,549,500 B2 | 6/2009 | Graham et al. | |
| 7,621,366 B2 | 11/2009 | Sewell et al. | |
| 7,650,960 B2 | 1/2010 | Bock | |
| 8,037,952 B2 | 10/2011 | Bock | |
| 8,991,429 B2 * | 3/2015 | Yoshimoto | G05G 9/047 137/636.1 |
| 9,476,447 B2 * | 10/2016 | Schmidt | B60G 7/005 |
| D771,152 S | 11/2016 | Rush | |
| D803,273 S | 11/2017 | Sewell | |
| 9,864,396 B1 | 1/2018 | Brown et al. | |
| 9,970,176 B2 | 5/2018 | Azure et al. | |
| 10,114,404 B2 | 10/2018 | Kukuk et al. | |
| 10,221,540 B2 | 3/2019 | Azure et al. | |
| 10,344,453 B2 | 7/2019 | Binstock et al. | |
| 11,079,294 B2 * | 8/2021 | Kageyama | G01B 7/00 |
| 11,841,729 B2 * | 12/2023 | Erkocak | G05G 25/04 |
| 2005/0034915 A1 | 2/2005 | Kumazawa | |

* cited by examiner

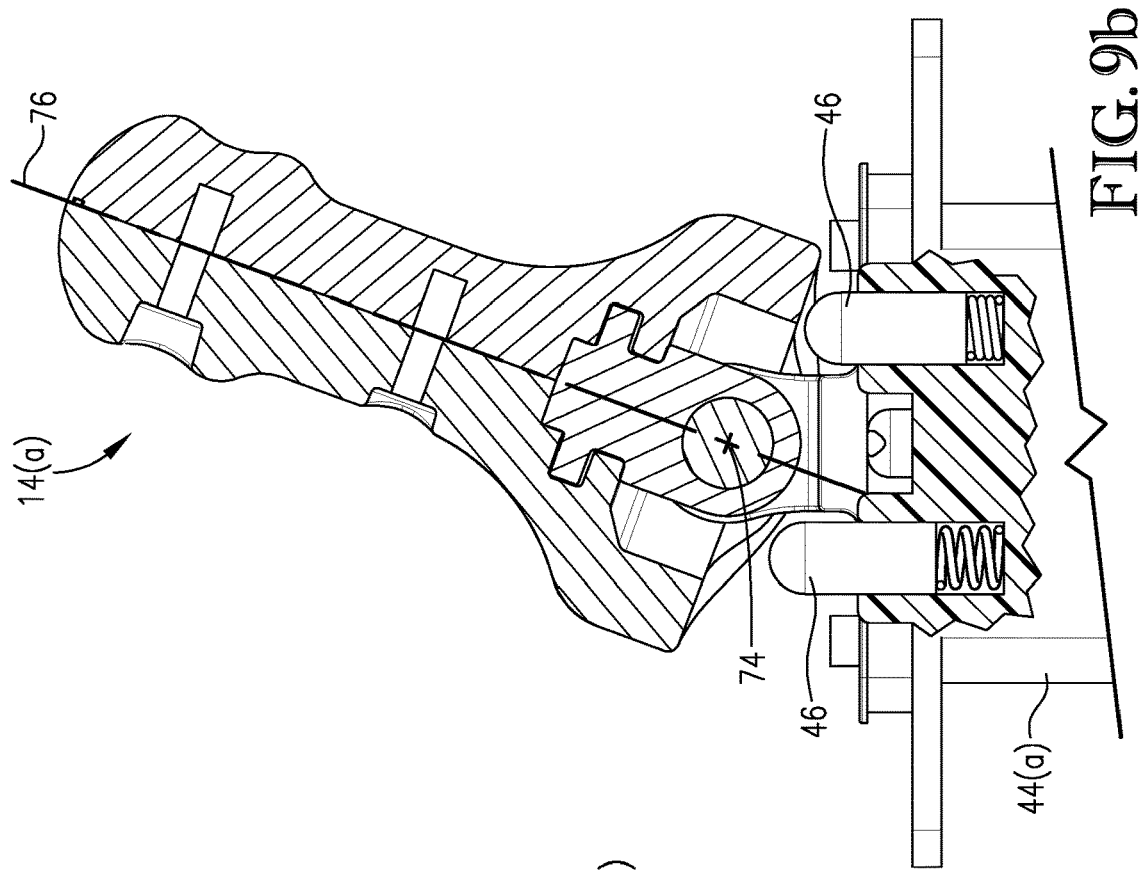
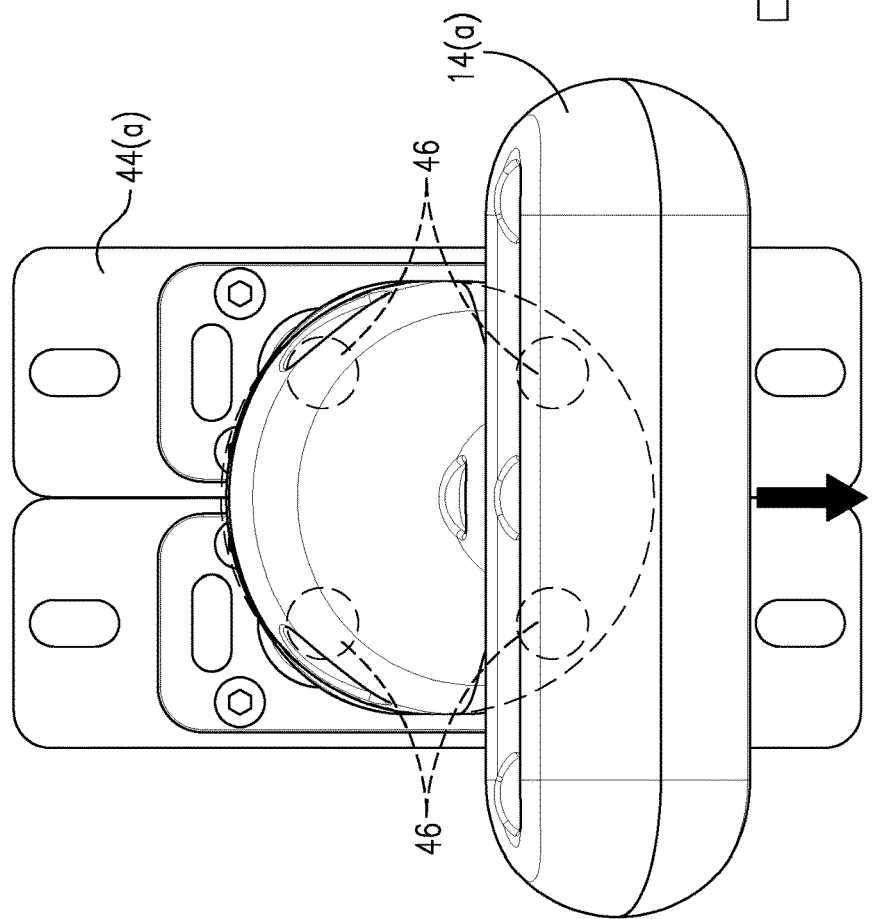

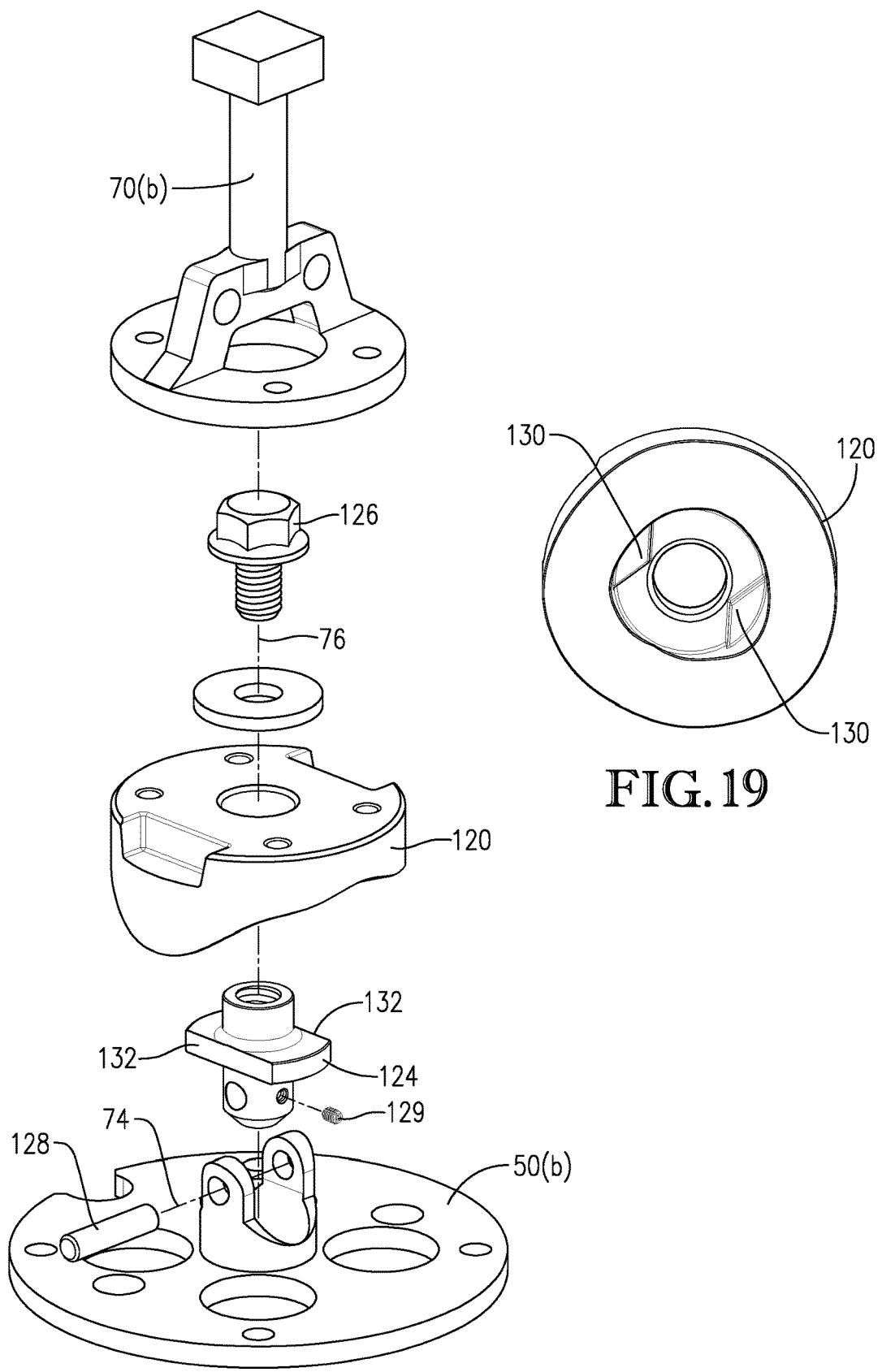
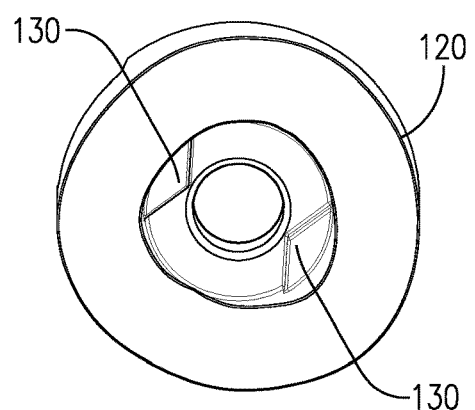
FIG.19
FIG.18

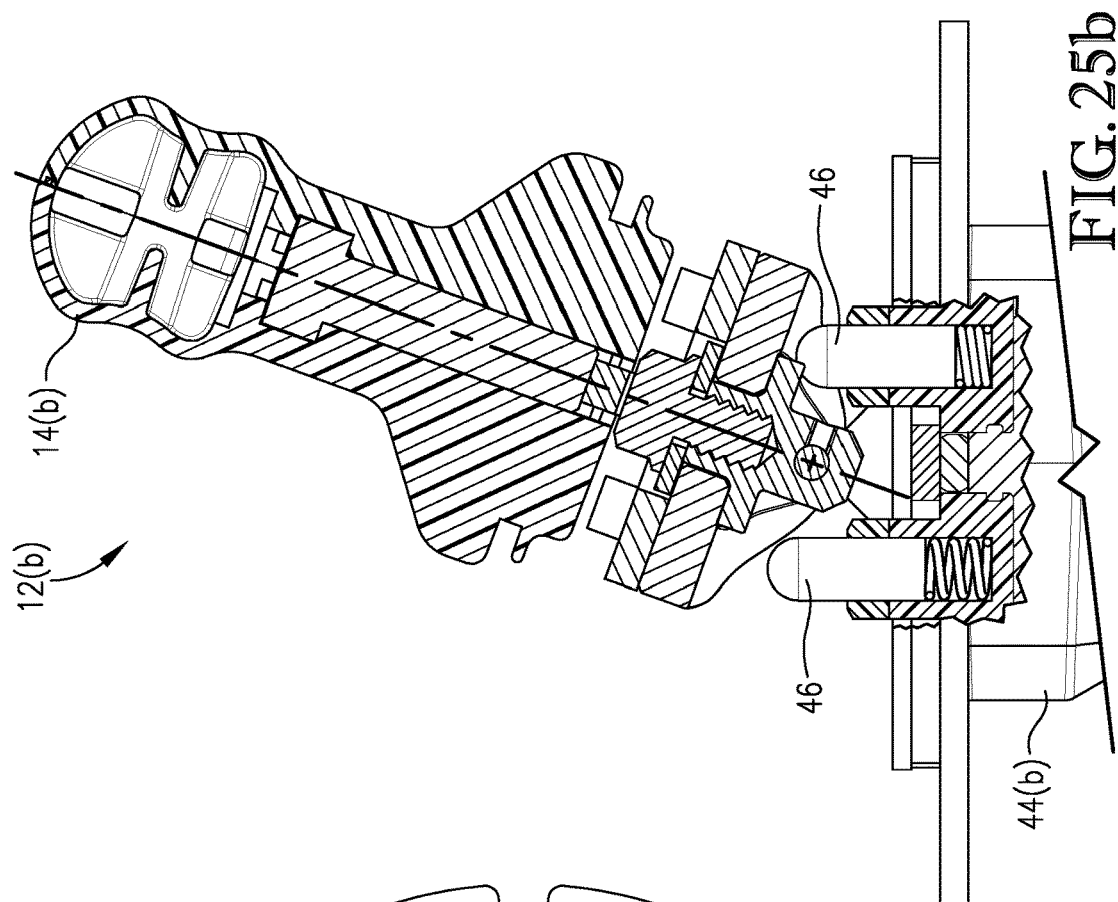
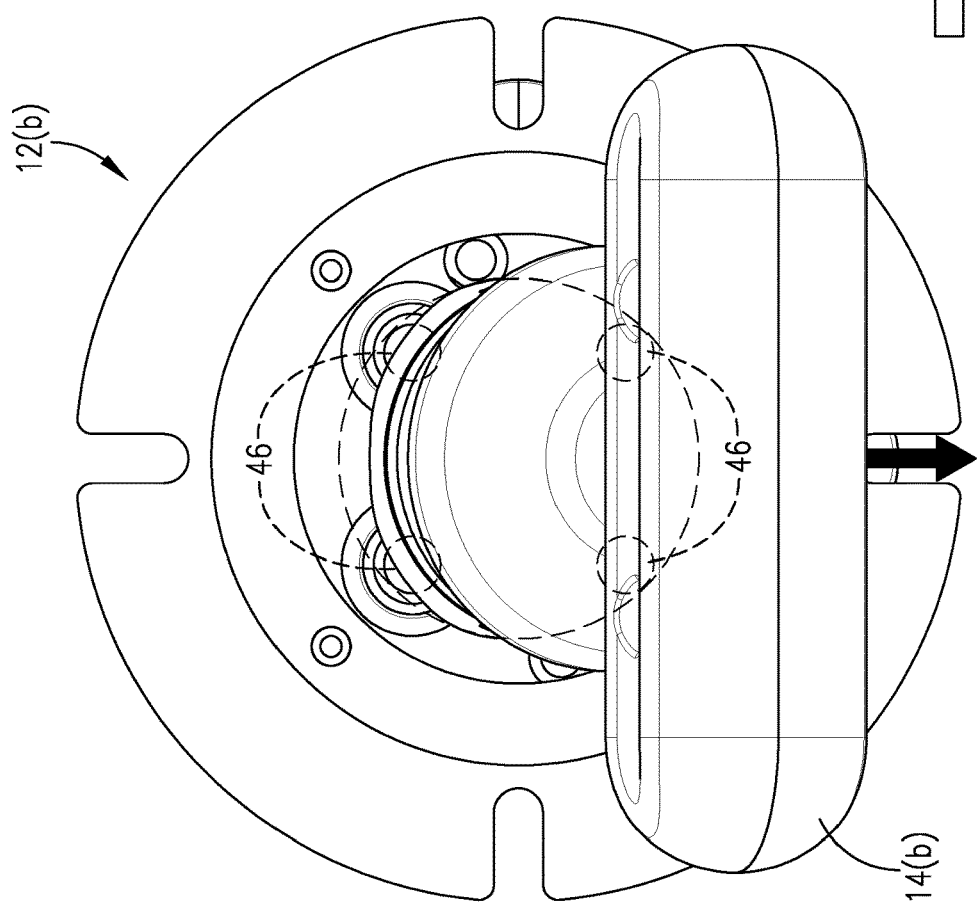

VEHICLE STEERING ASSEMBLY

CROSS-REFERENCE TO RELATED APPLICATIONS

The present non-provisional patent application is a continuation-in-part patent application, which claims priority to U.S. patent application Ser. No. 17/721,544, filed on Apr. 15, 2022, and entitled "VEHICLE STEERING ASSEMBLY," which claims priority to U.S. Pat. No. 11,305,806, filed on Aug. 14, 2019, and entitled "VEHICLE STEERING ASSEMBLY," which claims priority to U.S. Provisional Patent Application Ser. No. 62/718,801, filed on Aug. 14, 2018, and entitled "VEHICLE STEERING ASSEMBLY," with the entirety of the above-identified, previously-filed provisional application being hereby incorporated by reference into the present non-provisional patent application.

FIELD OF THE INVENTION

Embodiments of the present invention are generally directed to a vehicle steering assembly. More particularly, embodiments of the present invention are directed to an improved vehicle steering assembly for a compact utility loader.

BACKGROUND OF THE INVENTION

Compact utility loaders are becoming popular options for operators in need of heavy equipment machines. Compact utility loaders are capable of operating a variety of different hydraulically-driven tools or attachments for performing various types of demanding work. Beneficially, however, compact utility loaders are generally manufactured with a relatively smaller size compared to other heavy equipment machines, which can be beneficial for maneuverability, transport, and storage. Unfortunately, the control systems of previously-used compact utility loaders have been difficult, non-intuitive, and burdensome to use.

Often a compact utility loader will be maneuvered by traction elements (e.g., tracks or wheels) on either side of the loader. Generally, a compact utility loader will include a separate control element (e.g., a control handle) for controlling each traction element of the loader. The need for an operator to manipulate multiple control elements to maneuver a compact utility loader can make operation of the loader overly difficult and cumbersome. This is particularly true when the operator is required to maintain a free hand to control the loader's hydraulically-driven tools. As such, there is a need for an improved vehicle steering assembly, which enhances the ability of an operator to efficiently and intuitively control a vehicle, such as compact utility loader.

SUMMARY OF THE INVENTION

In one embodiment of the present invention, there is provided a vehicle steering assembly for controlling movement of a vehicle having independently rotatable left and right ground-engaging traction elements. The vehicle comprises a control panel within reach of an operator of the vehicle. The control panel comprises a panel support structure for supporting control mechanisms of the vehicle. The steering assembly comprises a T-shaped steering handle extending above the panel support structure, a steering controller positioned at least partly below the panel support structure, and a flexible protective cover attached to the steering handle. The steering handle comprises an upright shaft and a laterally extending crossmember rigidly coupled to the upright shaft. The upright shaft comprises a base that actuates the steering controller. The flexible protective cover extends around and is attached to the shaft. The flexible protective cover is configured to prevent dust and debris from entering the steering controller at the base of the shaft. The steering handle is shiftable relative to the panel support structure in forward and rearward directions to thereby cause corresponding forward and rearward rotation of both of the left and right traction elements. The steering handle is rotatable relative to the panel support structure in clockwise and counterclockwise directions to thereby cause a change in the relative speeds and directions of rotation of the left and right traction elements.

In another embodiment of the present invention, there is provided a steering control assembly for controlling movement of a vehicle having left and right traction elements. The steering control assembly comprises a steering handle, a steering controller, a flexible protective cover, and an attachment ring. The steering handle comprises an upright shaft and a cross-member fixed to a top of the upright shaft. The cross-member is configured for manual grasping by an operator of the vehicle. The steering controller is actuated by the steering handle and is configured to control movement of the vehicle based on the positioning of the steering handle. The flexible protective cover is attached to the shaft and is configured to prevent dust and debris from entering the steering controller. The attachment ring attaches the flexible protective cover to the shaft. The attachment ring comprises an inner portion and an outer portion and the shaft defines a circumferential recess receiving the inner portion of the attachment ring. The flexible protective cover defines an interior recess receiving the outer portion of the attachment ring. The attachment ring acts as a bushing between the shaft and the flexible protective cover so that the shaft can be rotated without causing corresponding rotation of the flexible protective cover. The steering handle is biased toward a neutral position so that the steering handle automatically returns to the neutral position when not acted upon by the operator of the vehicle. The steering control assembly is configured such that (i) tilting the steering handle forward from the neutral position toward a forward position causes forward rotation of both the left and right traction elements, (ii) tilting the steering handle rearward from the neutral position toward a rearward position causes rearward rotation of both the left and right traction elements, (iii) twisting of the steering handle clockwise from the neutral position toward a clockwise twisted position causes forward rotation of the left traction element and rearward rotation of the right traction element, and (iv) twisting of the steering handle counterclockwise from the neutral position toward a counterclockwise twisted position causes forward rotation of the right traction element and rearward rotation of the left traction element.

In another embodiment of the present invention, there is provided a method for controlling movement of a vehicle having independently rotatable left and right ground-engaging traction elements. The method includes a step of providing a steering handle comprising a laterally-extending crossmember and an upright extension member extending away from a control panel of the vehicle. The crossmember and the upright extension member are rigidly connected to one another so that shifting of the crossmember relative to the extension member is substantially prevented. An additional step includes shifting the steering handle in a forward direction to cause forward rotation of both of the left and right traction elements. An additional step includes shifting the steering handle in a rearward direction to cause rearward rotation of both of the left and right traction elements. A further step includes rotating the steering handle in a clockwise or counterclockwise direction to cause the left and right traction elements to rotate in opposing directions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 9a is a top plan view of the steering control assembly from FIG. 5, particularly showing the steering control assembly shifted in a rearward position;

FIG. 9b is side elevation view of the steering control assembly from FIG. 9a, particularly showing a vertical cross section of a steering handle, a handle connection member, and a portion of a steering controller;

FIG. 13b is a perspective view of the handle connection member from FIG. 13a;

FIG. 18 is an exploded view of the handle connection assembly from FIG. 17 in conjunction with a handle securement structure from the steering control assembly;

FIG. 19 is a bottom perspective view of a pedestal from the handle connection assembly from FIG. 18;

FIG. 20b is a perspective view of the horizontal cross section of the steering control assembly from FIG. 20a;

FIG. 25a is a top plan view of the steering control assembly from FIG. 26, particularly showing the steering control assembly shifted in a rearward position;

FIG. 25b is side elevation view of the steering control assembly from FIG. 25a, particularly showing a vertical cross section of a steering handle, a handle connection assembly, and a portion of a steering controller;

FIG. 28b is side elevation schematic view of the steering control assembly from FIG. 28a;

Figure 1:
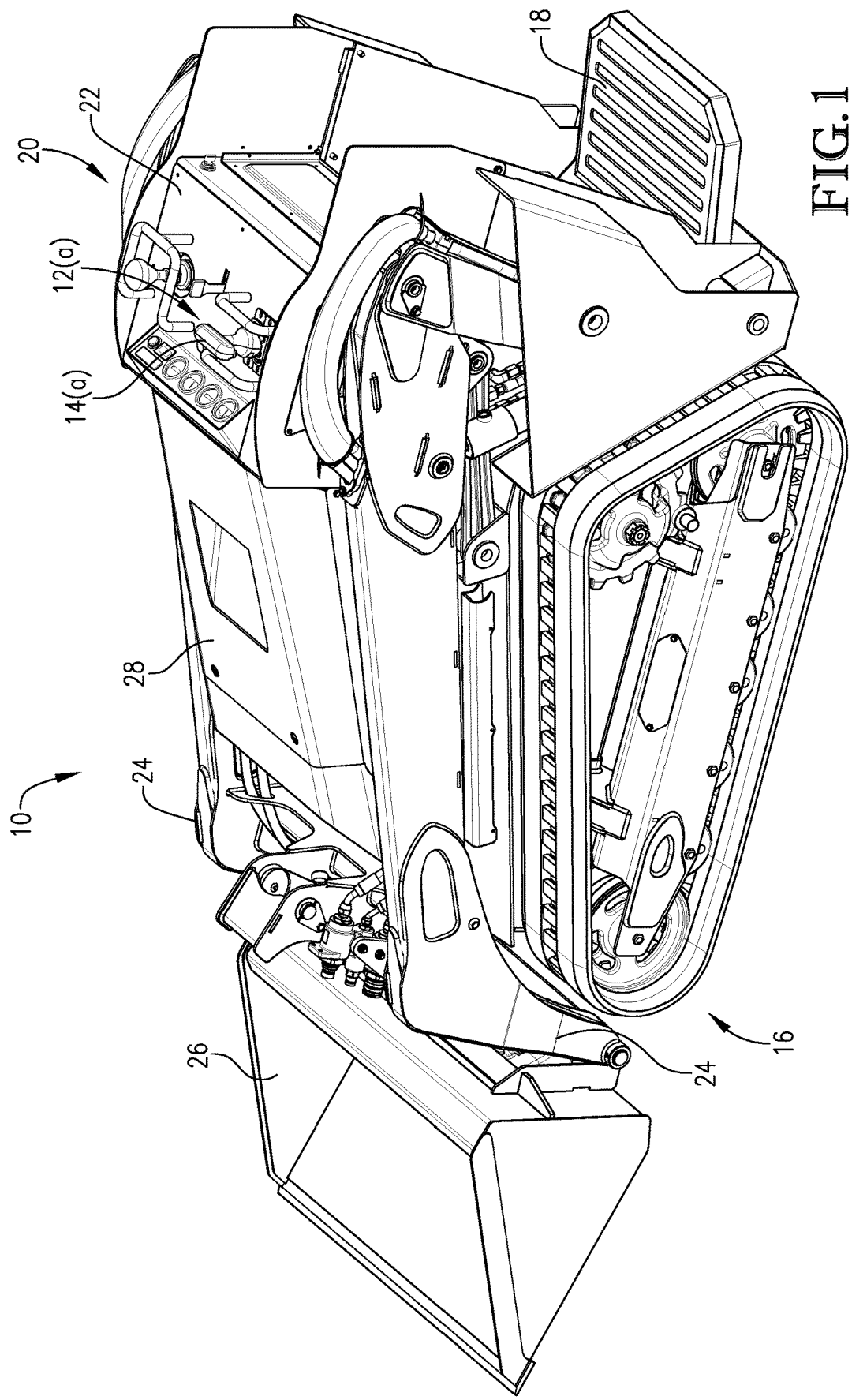
FIG. 1 is a left perspective view of a vehicle, in the form of a compact utility loader, with a steering control assembly according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
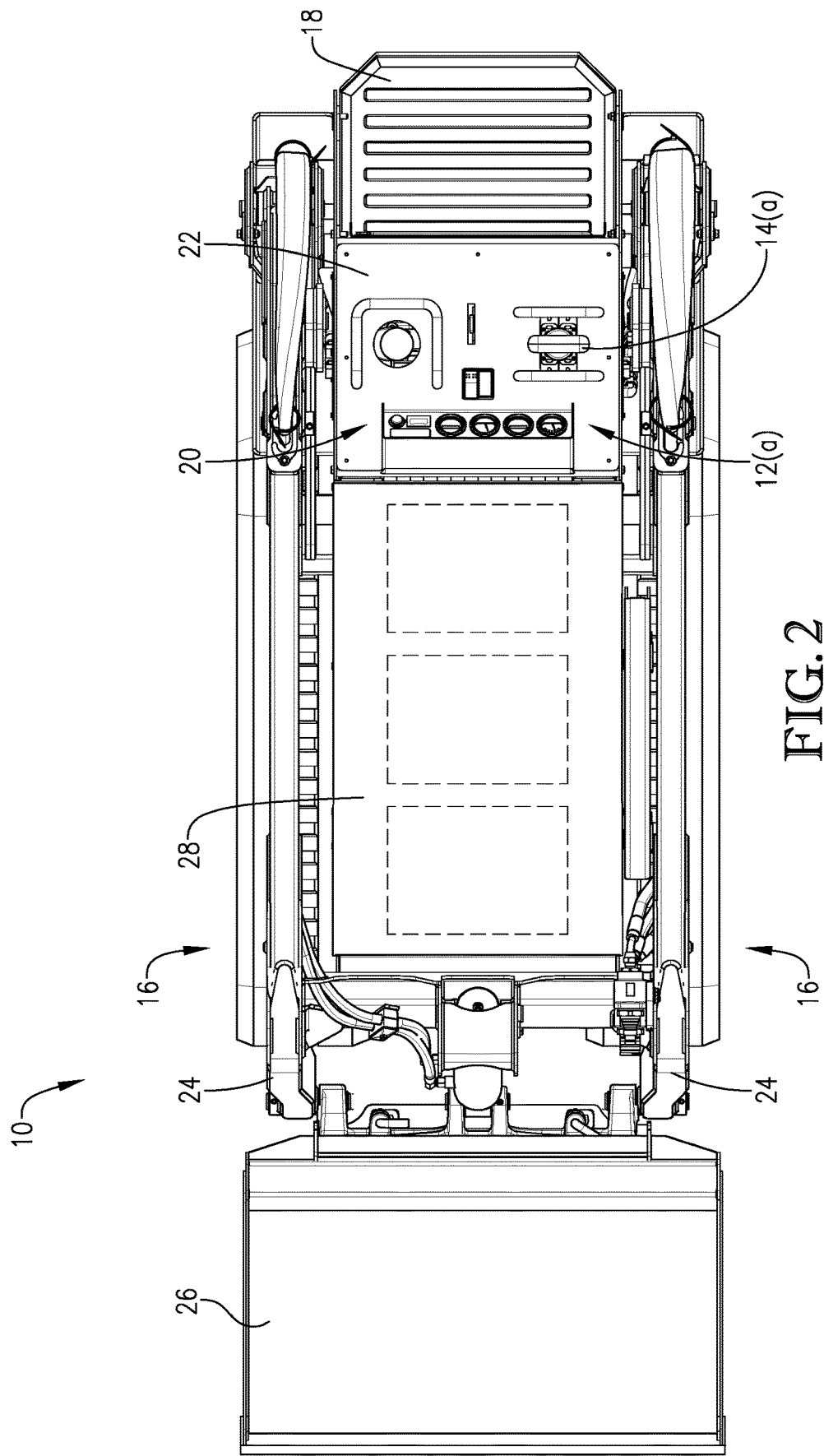
FIG. 2 is a top plan view of the compact utility loader of FIG. 1.

Broadly, embodiments of the present invention are directed to a steering control assembly for a vehicle, such as for a compact utility loader. FIGS. 1 and 2 show a vehicle in the form of a compact utility loader 10 (hereinafter "loader 10") equipped with a steering control assembly 12(a) that includes an improved steering handle 14(a). The steering handle 14(a) controls movement of the loader 10. Movement of the loader 10 is provided by independently rotatable left and right traction elements 16 (e.g., left and right endless tracks).

As shown in FIGS. 1 and 2, the loader 10 may include an operator platform 18 on which the operator stands while operating the loader 10. The loader 10 has a control panel 20 within reach and view of the operator. The control panel 20 includes a panel support structure 22 to which the steering control assembly 12(a) is connected. The loader 10 also includes a pair of lift arms 24 to which a working attachment 26 (e.g., a loader bucket) is connected.

The loader 10 includes a power source (not shown), such as a diesel engine positioned below a hood 28 of the loader 10, for powering the loader's 10 drive system and loader system. In certain embodiments, the power source can be a turbocharged diesel engine of less than 25 horsepower. Preferably, the power source has more than 20 horsepower. The drive system includes the loader's 10 drive train (e.g., hydraulic motors and/or a hydrostatic transmission) and the left and right traction elements 16 (e.g., tracks). The loader system includes the loader's 10 lift arms 24 and the working attachment 26 (e.g., loader bucket).

Although FIGS. 1 and 2 show a compact utility loader 10 with traction elements 16 in the form of endless tracks, the loader 10 can be any type of vehicle having independently rotatable left and right traction elements 16 (e.g., tracks or wheels), such as, for example, a skid steer loader, an excavator, a tractor, or a bulldozer.

Although FIGS. 1 and 2 show the working attachment 26 in the form of a loader bucket connected to the end of the lift arms 24, the working attachment 26 could be selected from a variety of different useful tools, such as, for example, a trencher, a tiller, a posthole digger, a mower, a fork lift, a grapple rake, a hydraulic breaker, a snow thrower, a box rake, a stump grinder, a utility blade, or a trench filler.

Figure 3:
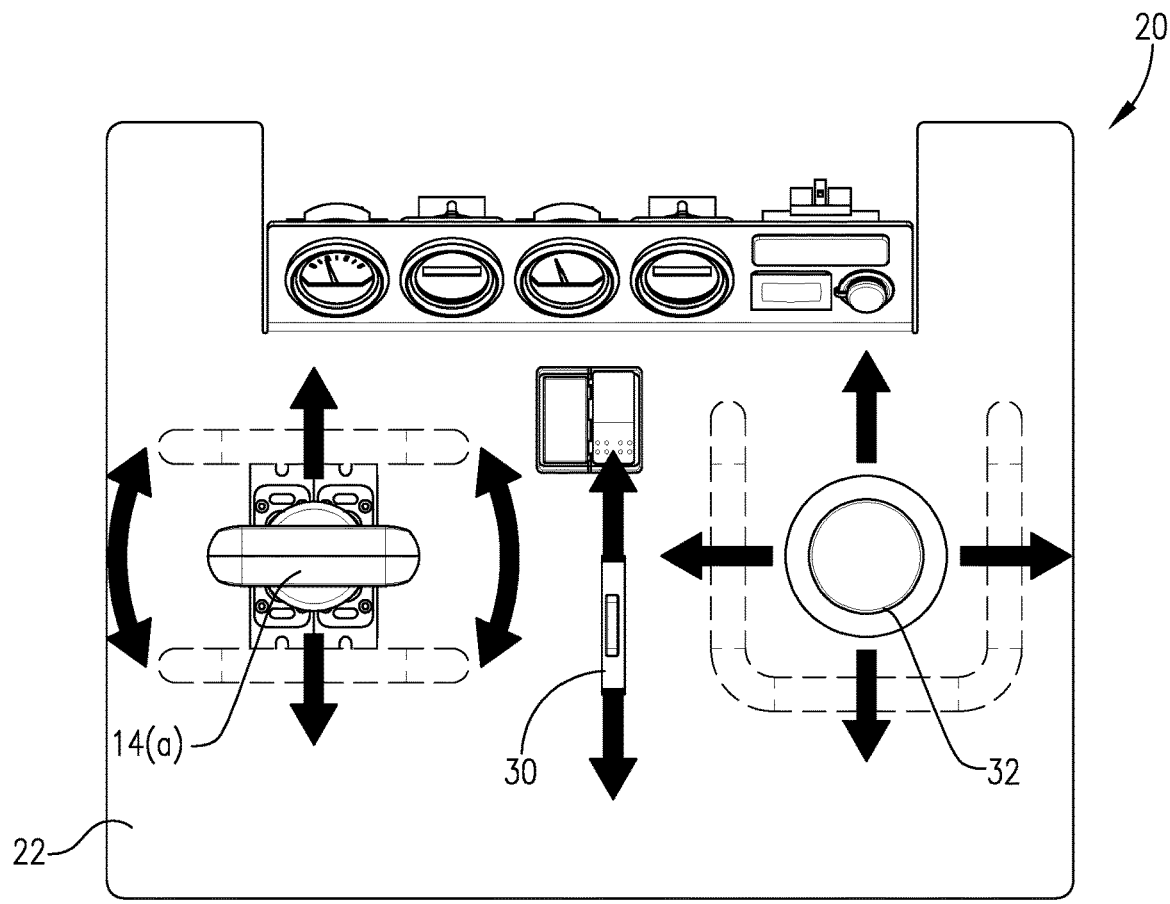
FIG. 3 is a top plan view of a control panel from the compact utility loader of FIGS. 1 and 2.

Turning to FIG. 3 a top view of the loader's 10 control panel 20 is shown, illustrating that the control panel 20 can include an information portion, such as gauges, graphic displays, and the like, which provides visual information to the operator. The control panel 20 can additionally include a control portion, which can be manually manipulated by the operator to control the loader 10. The control portion of the control panel 20 can include switches, the steering handle 14(a), a throttle handle 30, and a loader handle 32.

As illustrated by the arrows in FIG. 3, the steering handle 14(a), the throttle handle 30, and the loader handle 32 can be manually manipulated in various directions to control movement and speed of various portions of the loader 10. In particular, the steering handle 14(a) can be manually manipulated forwardly and rearwardly and can be manually twisted in clockwise and counterclockwise directions to control the speed and direction of rotation of the left and right traction elements 16. As used herein, the terms "forward" or "forwardly" refer to a direction towards a front of the loader 10, such as where the working attachment 26 is connected to the loader 10. The terms "rearward" or "rearwardly" refer to a direction towards a back of the loader 10, such as where the operator stands on the operator platform 18 to operate the loader 10. The terms "right" and "left" means a right direction and a left direction, respectively, when viewing forwardly from the back of the loader 10. The terms "clockwise" and "counterclockwise" means a clockwise direction and a counterclockwise direction, respectively, when looking down on the applicable component from above the component. Thus, with respect to the view of the control panel 20 on FIG. 2, a forward direction is toward the left side of the figure, a rearward direction is toward the right side of the figure, a left direction is toward the bottom side of the figure, a right direction is toward the top side of the figure, a clockwise direction is clockwise (as looking down on the loader 10), and a counter-clockwise direction is counter-clockwise (as looking down on the loader 10).

Figure 4:
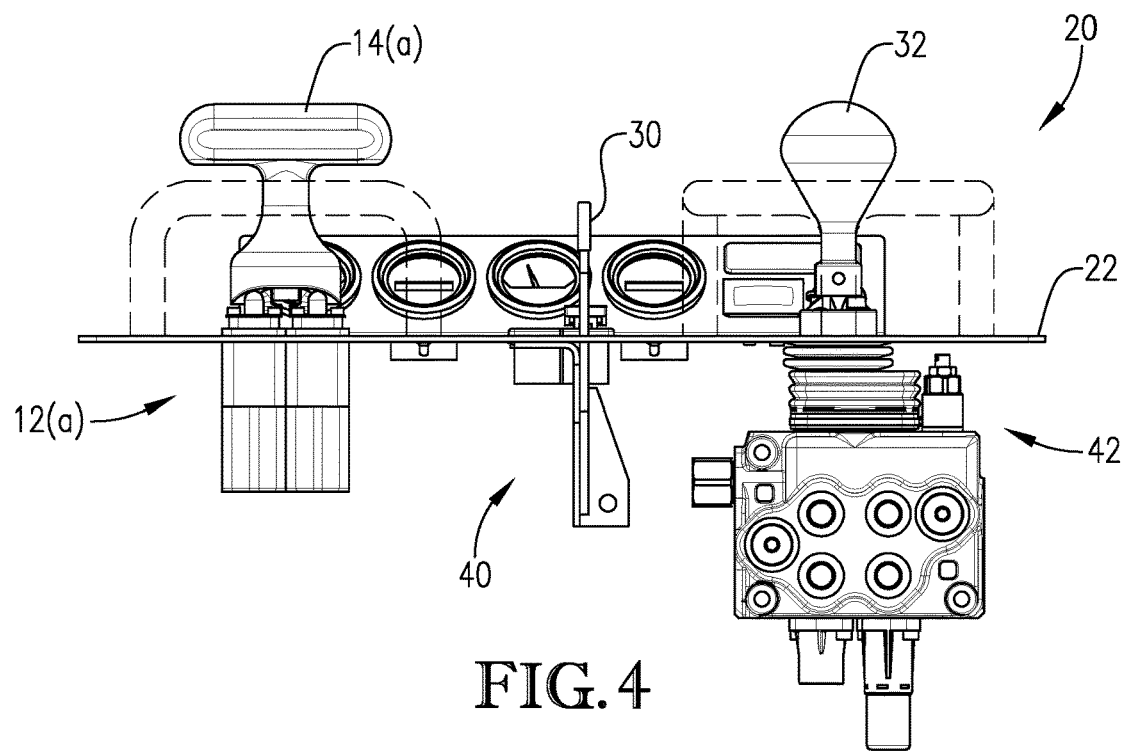
FIG. 4 is a rear elevation view of the control panel from FIG. 3.

FIG. 4 is a vertical view from the rear of the panel support structure 22 of the control panel 20, with the panel support structure shown supporting the steering control assembly 12(a), a throttle control assembly 40, and a lift control assembly 42. The steering, throttle, and lift control assemblies 12(a), 40, and 42 include manually movable handles (i.e., steering handle 14(a), throttle handle 30, and lift handle 32, respectively) each being connected to a controller. The handles 14(a), 30, 32 extending generally above the panel support structure 22 and the corresponding controllers extending generally below the panel support structure 22. Each controller is rigidly coupled to the panel support structure 22 and each handle 14(a), 30, 32 is shiftable relative to the controller to which it is coupled. In some embodiments, the controllers may be secured to the panel support structure 22 in a manner that permits an upper portion of the controllers (e.g., depressible buttons disclosed in more detail below) to extend upward above the panel support structure 22. Although not shown in the drawing, a protective cover 33 (e.g., flexible boot) can be attached to the shaft 35 of each handle 14(a), 30, 32 to prevent dust and debris from entering the controllers at the base 54 of the shaft 35.

Figure 5:
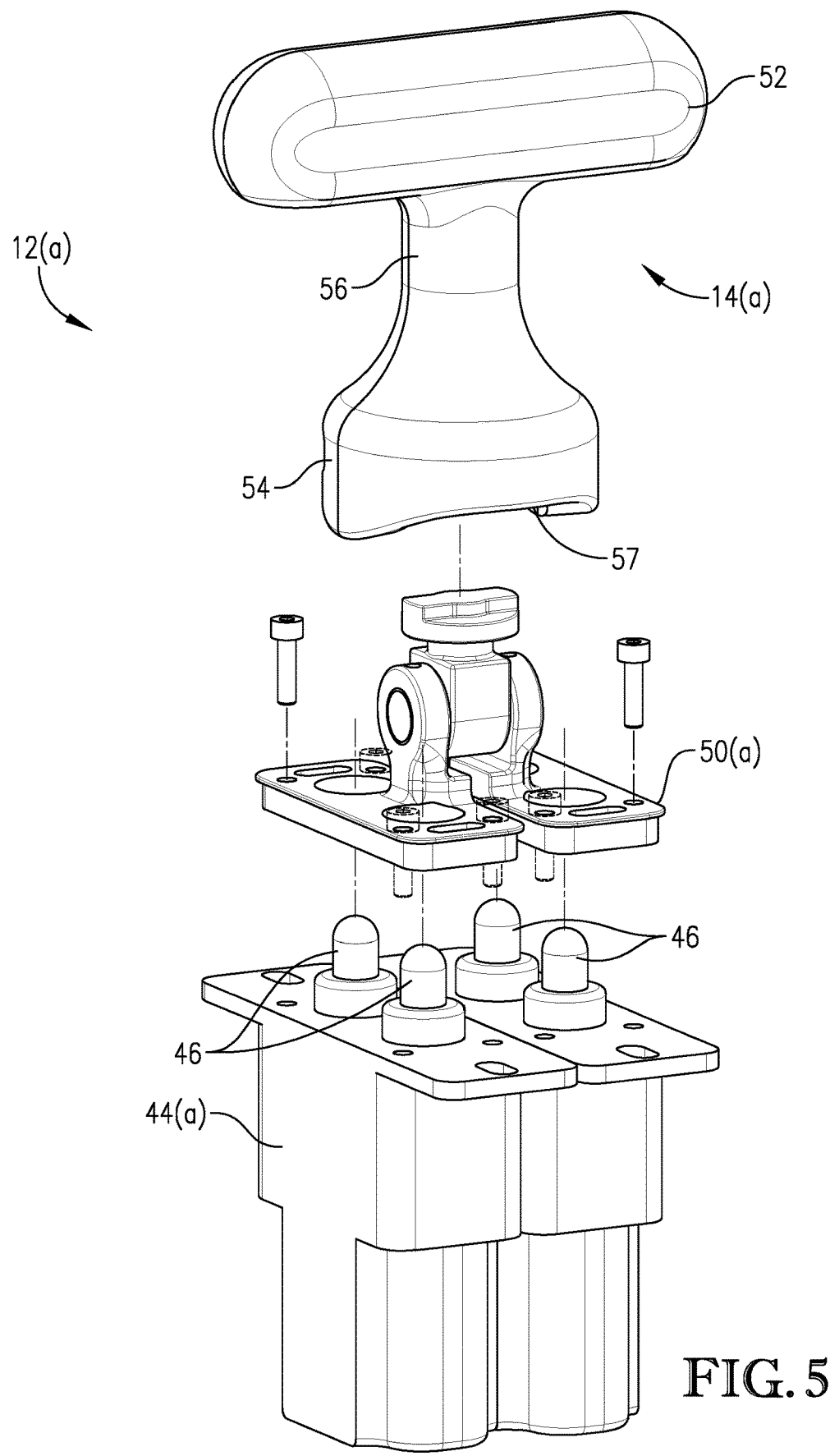
FIG. 5 is an exploded view of a steering control assembly from the control panel from FIGS. 3 and 4.

FIG. 5 is an exploded view of the steering control assembly 12(a). As shown in FIG. 5, the controller of the steering control assembly 12(a) is a steering controller 44(a), which in certain embodiments may be a hydraulic pilot control valve in communication with the loader's 10 drive train (e.g., hydraulic motors and/or a hydrostatic transmission). The steering controller 44(a) is equipped with four depressible buttons 46 that cooperatively control the speed and direction of rotation of the loader's 10 traction elements 16 (e.g., tracks or wheels) via communication between the steering controller 44(a) and the loader's 10 drive train (e.g., hydraulic motors and/or a hydrostatic transmission). A front left button 46 may control the forward direction of the left the traction element 16, while a rear left button 46 may control the rearward direction of the left the traction element 16. In some embodiments, the rear left button 46 will be position behind the front left button 46. Similarly, a front right button 46 may control the forward direction of the right the traction element 16, while a rear right button 46 may control the rearward direction of the right the traction element 16. In some embodiments, the rear right button 46 may be position behind the front right button 46. In addition, the front right and the rear right buttons 46 may be positioned, respectively, to the right of the front left and the rear left buttons 46. The steering handle 14(a) is coupled to the steering controller 44(a) and is used to depress the buttons 46 in a manner that, as will be described in more detail below, allows for simple and intuitive control of the movement of the loader.

Remaining with FIG. 5, the steering control assembly 12(a) includes a handle securement structure 50(a) that is used to connect the steering handle 14(a) to the steering controller 44(a) in a manner that allows the steering handle 14(a) to be shifted forward, shifted rearward, rotated clockwise, and rotated counterclockwise relative to the steering controller 44(a), as described in more detail below. In some embodiments, the handle securement structure 50(a) will be rigidly secured to the steering controller 44(a) via a plurality of threaded fasteners that extend down through both the handle securement structure 50(a) and the steering controller 44(a). The steering controller 44(a) may itself be rigidly secured to the panel support structure 22 via a plurality of threaded fasteners that extend down through both the panel support structure 22 and the steering controller 44(a).

The steering handle 14(a) may include an upper crossmember 52, a lower base 54, and an upright extension member 56 extending between the base 54 and the crossmember 52. The crossmember 52 and the upright extension member 56 can be connected in a generally T-shaped configuration. In some embodiments, the crossmember 52 and the upright extension member 56 may be rigidly connected to one another so that shifting of the crossmember 52 relative to the upright extension member 56 is substantially (or completely) prevented. Furthermore, in some embodiments, the steering control assembly 12(a) will be connected to the panel support structure 22 in such a manner that the crossmember 52 is substantially (or completely) prevented from lateral shifting relative to the panel support structure 22. In such embodiments, for instance, only forward, rearward, and rotating movements of the steering handle 14(a) relative to the panel support structure 22 will be permitted.

A bottom of the base 54 may presents a curved lower or bottom surface 57 that is configured to contact the depressible buttons 46 and selectively depress the buttons 46 as the steering handle 14(a) is manually manipulated. In some of such embodiments, the crossmember 52, the upright extension member 56, and the base 54 will be integrally formed from a unitary piece of material.

Although the crossmember 52 of the steering handle 14(a) is depicted herein as being a substantially straight elongated member that is connected to the top of the upright extension member 56 to form a T-shape configuration, it should be understood that the crossmember 52 can take on a variety of shapes for facilitating manual grasping by the operator of the loader 10. For example, the crossmember 52 can have an irregular ergonomic shape that conforms to the hand of the operator. In certain specific embodiments, the steering handle 14(a) will only include a single upright extension member 56.

Figure 6:
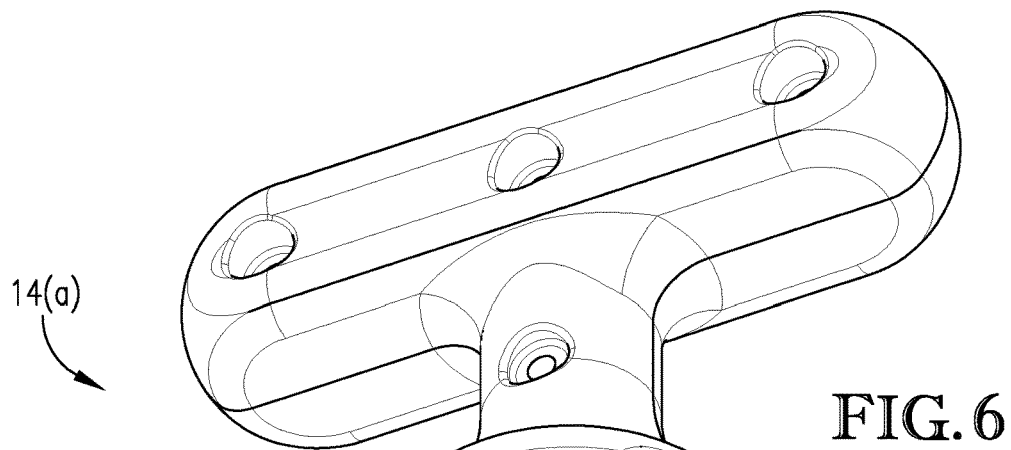
FIG. 6 is a steering handle and a handle connection member from the steering control assembly from FIG. 5.

FIG. 6 shows the bottom of the steering handle 14(a) in more detail. In particular, FIG. 6 shows that the curved bottom surface 57 of the base 54 includes a curved topography with a substantially flat front section 60, a substantially flat rear section 62, a pair of left-side downwardly sloping sections 64, and a pair of right-side downwardly sloping sections 66. The left-side downwardly sloping sections 64 are formed on the sides of a left downward projection 68 of the base 54. It should be understood that the left downward projection 68 extends down below the front and rear sections 60, 62. The right-side downwardly sloping sections 66 are formed on the sides of a right downward projection 69 of the base 54. It should be understood that the right downward projection 69 extends down below the front and rear sections 60, 62.

FIG. 6, also shows that the base 54 includes an internal opening within which a handle connection member 70(a) is received. The handle connection member 70(a) is used to connect the steering handle 14(a) with the steering controller 44(a) in a manner that allows the steering handle 14(a) to be shifted forward, shifted rearward, rotated clockwise, and rotated counterclockwise relative to the steering controller 44(a), as described in more detail below.

Figure 7A:
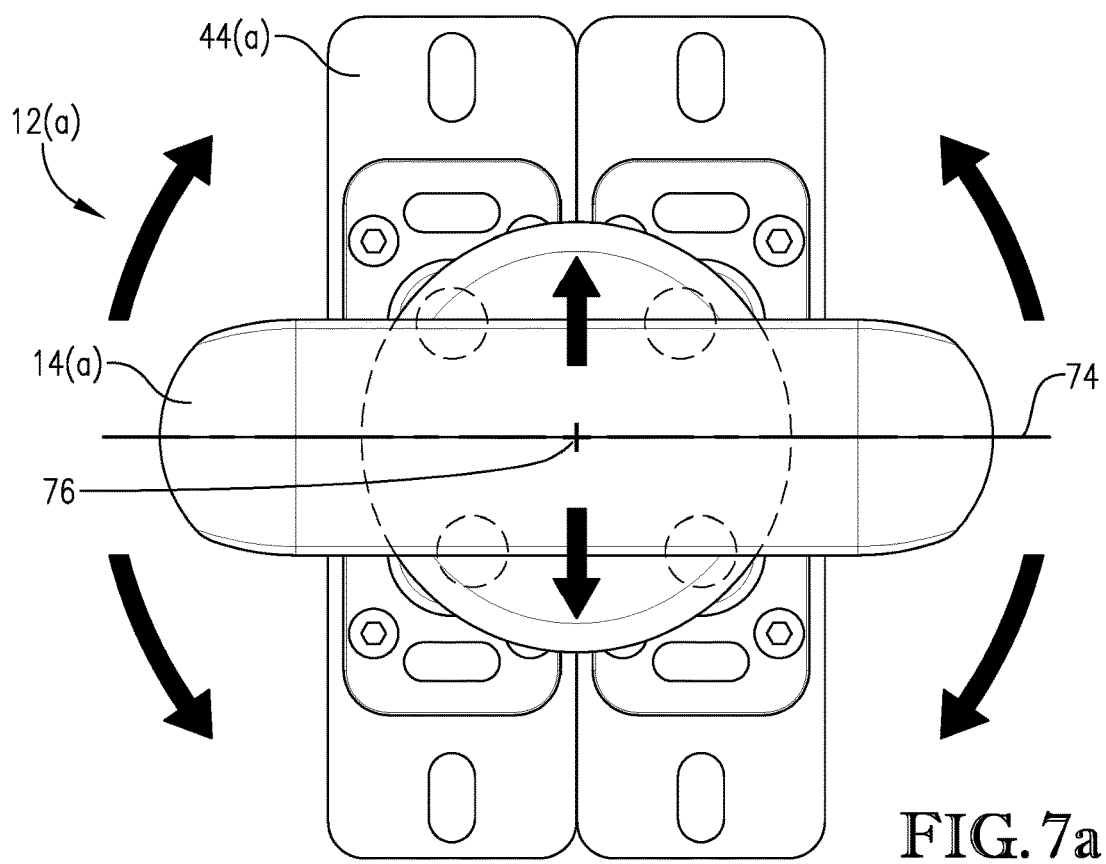
FIG. 7a is a top plan view of the steering control assembly from FIG. 5, particularly showing the steering control assembly in a neutral position.

FIGS. 7a (top view) and 7b (side view) show the steering control assembly 12(a) in a neutral position. When the steering control assembly 12(a) is in the neutral position, none of the depressible buttons 46 are depressed enough to cause rotation of the right or left traction elements 16 of the loader 10. The steering control assembly 12(a) is biased toward this neutral position so that if the operator of the loader 10 releases a hand grip on the steering handle 14(a), the loader 10 stops.

Figure 7B:
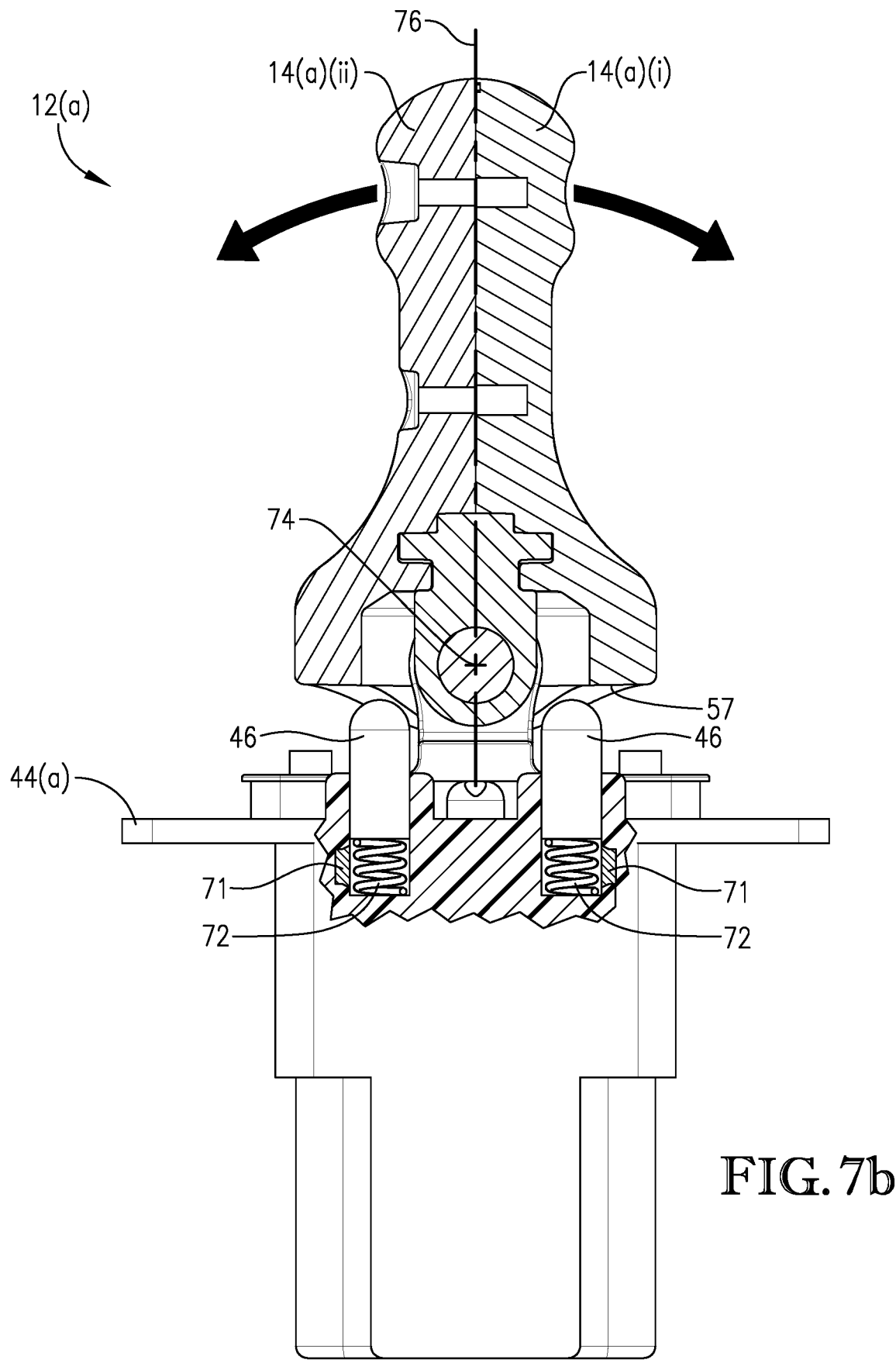
FIG. 7b is side elevation view of the steering control assembly from FIG. 7a, particularly showing a vertical cross section of a steering handle, a handle connection member, and a portion of a steering controller.

As illustrated by FIG. 7b, the steering controller 44(a) includes, for each depressible button 46, a variable switch 71 (or pilot valve spool) and a biasing mechanism 72 for biasing the depressible buttons 46 upwardly. The variable switch 71 may comprise a position sensor that measures the depth of depression of the depressible button 46 and permits the speed of rotation of the traction elements 16 to be controlled in a manner that is proportional to the depth of depression of the depressible button 46. In some embodiments, as noted above, the steering controller 44(*a*) may be a hydraulic pilot control valve and movement of the depressible buttons 46 directly adjusts the flow or pressure of hydraulic fluid through the control valve. For example, each of the depressible buttons 46 may activate an associated variable switch 71 and/or may move an associated spool in the steering controller 44(*a*) when the depressible button 46 is depressed. Such actuation of the variable switch 71 and/or the spool will generate (or change) a pilot pressure signal that is sent from the steering controller 44(*a*) to the loader's 10 drive train (e.g., the hydrostatic transmission that controls the hydraulic motors). The pilot pressure signal sent to the loader's 10 drive train will be based on the depth at which the depressible button 46 is depressed. As such, when the depressible button 46 is fully depressed, a pilot pressure signal is sent to the loader's 10 drive train (e.g., to the hydrostatic transmission) to cause the associated traction element 16 to be rotated at a maximum rate. If the depressible button 46 is depressed a lesser amount (i.e., less than a full depression), a pilot pressure signal is sent to the loader's 10 drive train (e.g., to the hydrostatic transmission) to cause the associated traction element 16 to be rotated at a rate that is less than the maximum rate. It is further understood that one depressible button 46 (e.g., the front left button 46) is used to generate a pilot control signal that causes the left traction element 16 to rotate in a forward direction, while another depressible button 46 (e.g., the rear left button 46) is used to generate a pilot control signal that causes the left traction element 16 to rotate in a rearward direction. Similarly, one depressible button 46 (e.g., the front right button 46) is used to generate a pilot control signal that causes the right traction element 16 to rotate in a forward direction, while another depressible button 46 (e.g., the rear right button 46) is used to generate a pilot control signal that causes the right traction element 16 to rotate in a rearward direction.

The biasing mechanism 72 associated with each depressible button 46 pushes the button 46 up against the bottom surface 57 of the steering handle 14(*a*). When the steering handle 14(*a*) is not being manually manipulated out of the neutral position, all the depressible buttons are fully extended and the steering handle 14(*a*) is maintained in the neutral position by the depressible buttons 46 pushing up against the substantially flat front and rear sections 60, 62 of the curved bottom surface 57 of the base 54.

FIGS. 7*a* and 7*b* show that the steering handle 14(*a*) is connected to the steering controller 44(*a*) in a manner that allows the steering handle 14(*a*) to be shifted/tilted forward and rearward on a tilt axis 74. Further, the steering handle 14(*a*) is connected to the steering controller 44(*a*) in manner that allows the steering handle 14(*a*) to be rotated/twisted clockwise and counterclockwise on a twist axis 76. The tilt axis 74 and twist axis 76 are maintained substantially perpendicular to one another, even during shifting or rotating of the steering handle 14(*a*).

Figure 8B:
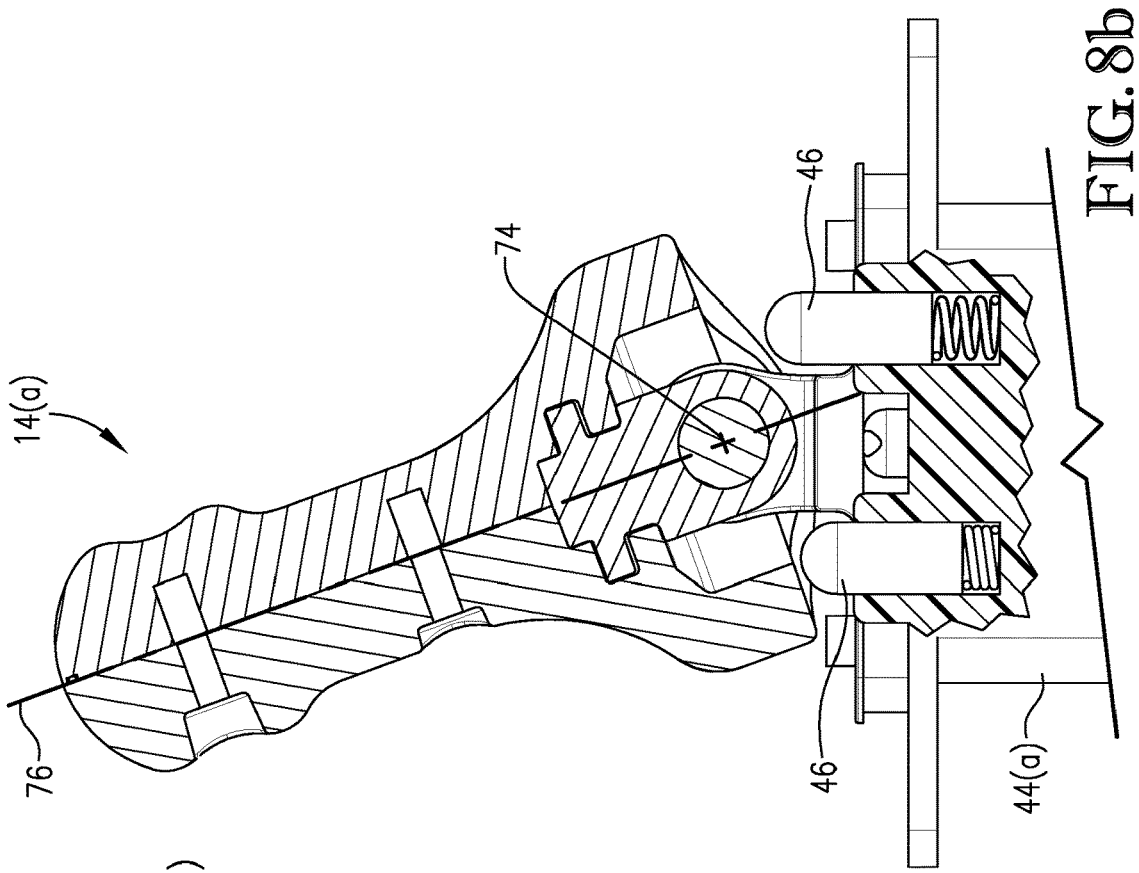
FIG. 8b is side elevation view of the steering control assembly from FIG. 8a, particularly showing a vertical cross section of a steering handle, a handle connection member, and a portion of a steering controller.
Figure 8A:
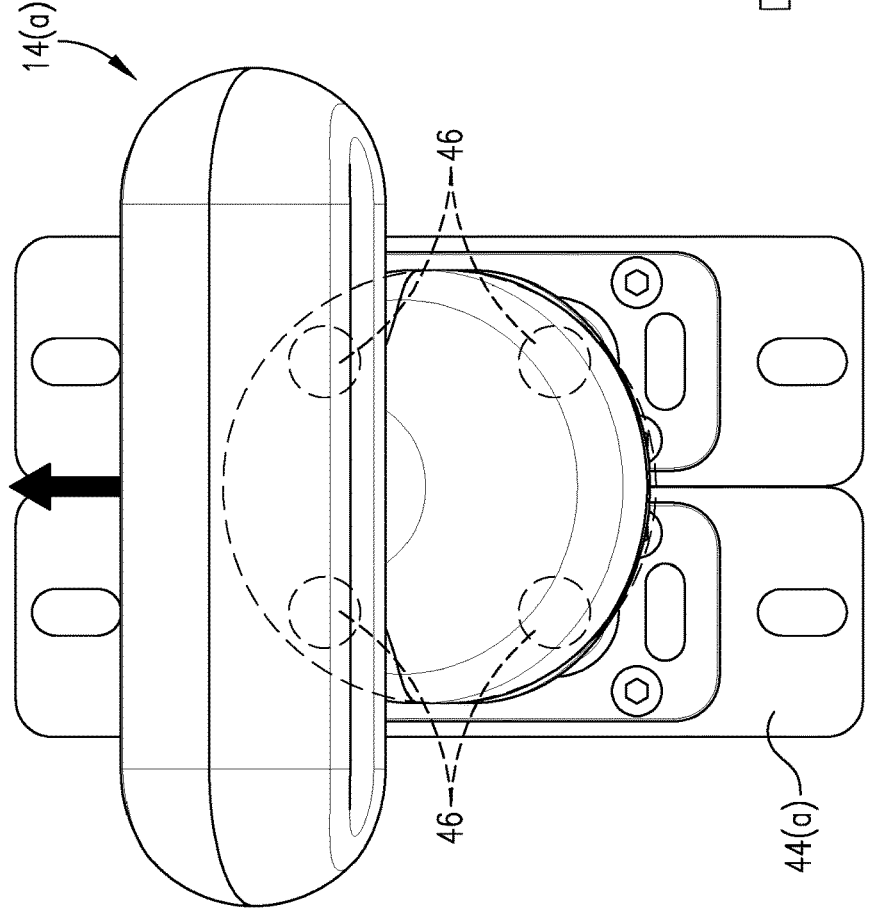
FIG. 8a is a top plan view of the steering control assembly from FIG. 5, particularly showing the steering control assembly shifted in a forward position.

As shown in FIGS. 8*a* (top view) and 8*b* (side view) shifting the steering handle 14(*a*) forward on the tilt axis 74 (See FIG. 8*b*), without rotating the steering handle 14(*a*) on the twist axis 76 (See FIG. 8*b*), depresses the front left and right depressible buttons 46. When the front left and right depressible buttons 46 are depressed an equal amount, as shown in FIGS. 8*a* and 8*b*, the left and right traction elements 16 rotate forward at substantially the same speed, so the loader 10 travels straight forward. It should be understood that the further the front left and right depressible buttons 46 are depressed the faster the left and right traction elements 16 will rotate so as to increase the speed of the loader 10. As such, when the steering handle 14(*a*) is shifted fully forward, the left and right front depressible buttons 46 will be depressed a maximum amount, and the left and right traction elements 16 will rotate forwardly at a maximum rate to cause the loader to drive forward at a maximum speed.

As shown in FIGS. 9*a* (top view) and 9*b* (side view), shifting the steering handle 14(*a*) rearward on the tilt axis 74, without rotating the steering handle 14(*a*) on the twist axis 76, depresses the rear left and right depressible buttons 46. When the rear left and right depressible 46 buttons are depressed an equal amount, as shown in FIGS. 9*a* and 9*b*, the left and right traction elements 16 rotate reward at substantially the same speed, so the loader 10 travels straight backward (i.e., in reverse). It should be understood that the further the rear left and right depressible buttons 46 are depressed the faster the left and right traction elements 16 will rotate so as to increase the speed of the loader 10. As such, when the steering handle 14(*a*) is shifted fully rearward, the left and right rear depressible buttons 46 will be depressed a maximum amount, and the left and right traction elements 16 will rotate rearwardly at a maximum rate to cause the loader to drive backward at a maximum speed.

Figure 10B:
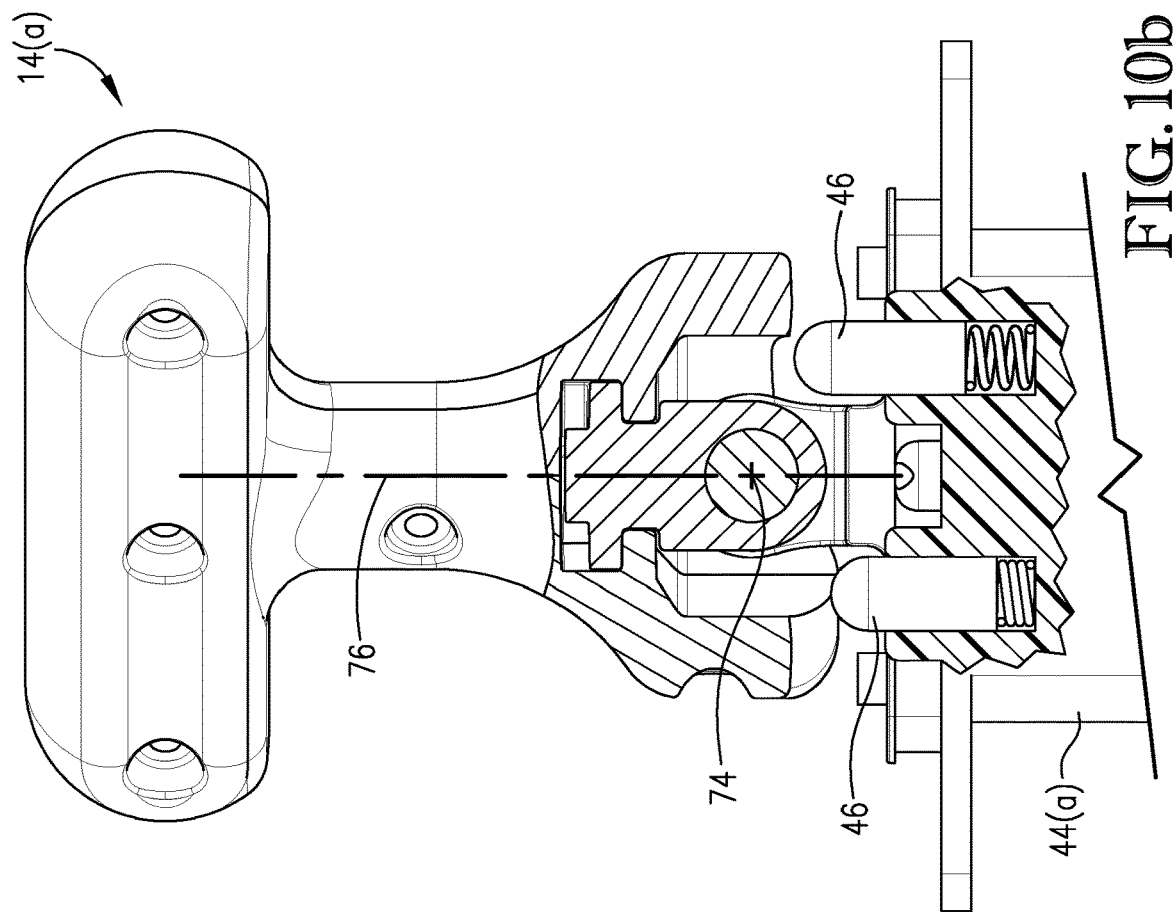
FIG. 10b is side elevation view of the steering control assembly from FIG. 10a, particularly showing a vertical cross section of a steering handle, a handle connection member, and a portion of a steering controller.
Figure 10A:
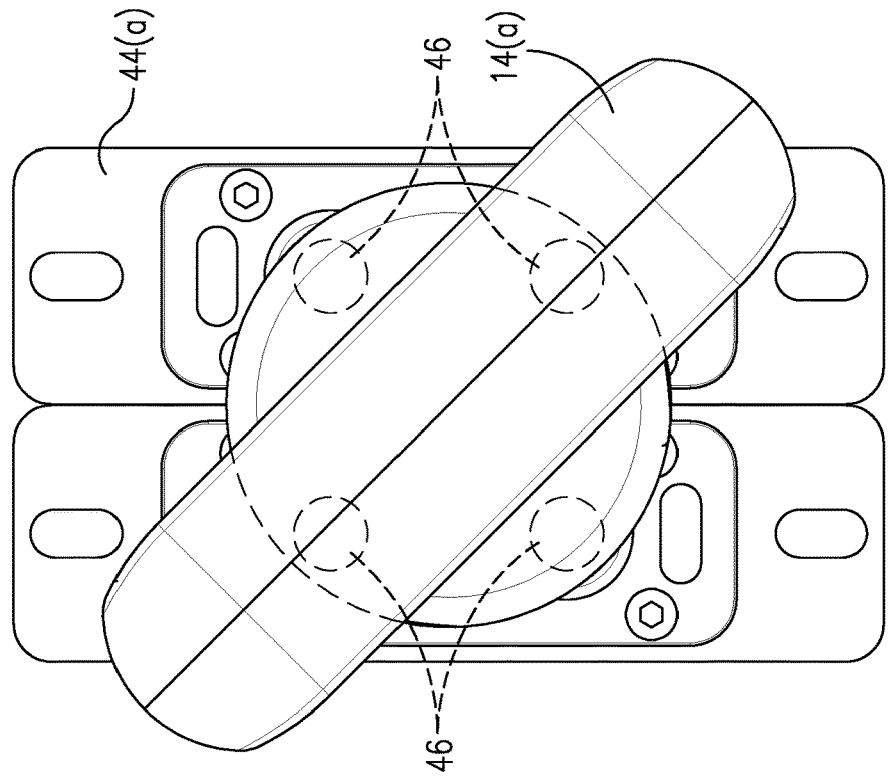
FIG. 10a is a top plan view of the steering control assembly from FIG. 5, particularly showing the steering control assembly rotated in a clockwise position.

As shown in FIGS. 10*a* (top view) and 10*b* (side view), rotating the steering handle 14(*a*) clockwise on the twist axis 76, without shifting the steering handle 14(*a*) forward or rearward on the tilt axis 74, depresses the front left and rear right depressible buttons 46. When the front left and rear right depressible buttons 46 are depressed an equal amount and the front right and rear left depressible buttons 46 are not depressed, as shown in FIGS. 10*a* and 10*b*, the left and right traction elements 16 rotate at substantially the same speed, with the left traction element 16 rotating forward and the right traction element 16 rotating rearward. In this configuration, the loader 10 turns clockwise without traveling forward or backward. It should be understood that the further the front left and rear right depressible buttons 46 are depressed the faster the left and right traction elements 16 will rotate so as to increase the turning speed or severity of the turn (i.e., the right turn) of the loader 10. As such, when the steering handle 14(*a*) is rotated clockwise a full amount forward, the front left and rear right depressible buttons 46 will be depressed a maximum amount, and the left and right traction elements 16 will rotate oppositely at a maximum rate to cause the loader to turn in a clockwise direction at a maximum speed/severity.

Figure 11B:
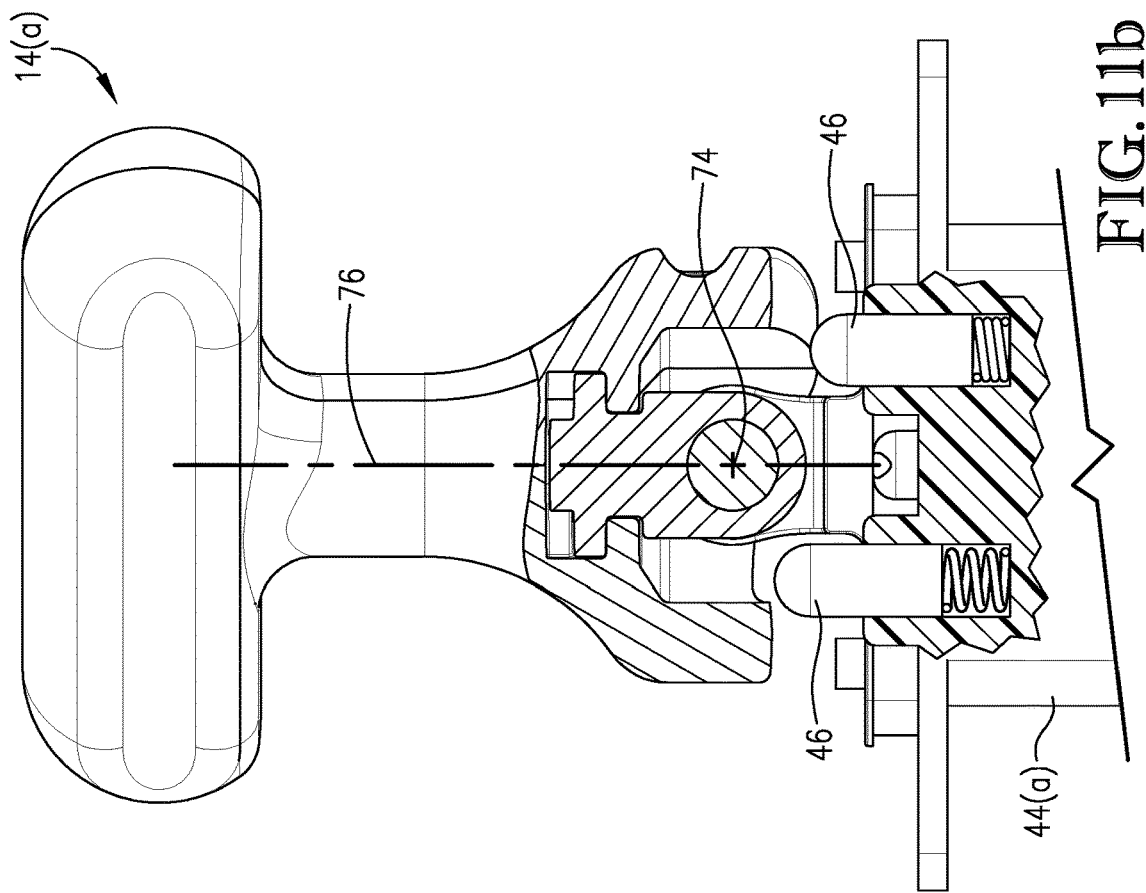
FIG. 11b is side elevation view of the steering control assembly from FIG. 11a, particularly showing a vertical cross section of a steering handle, a handle connection member, and a portion of a steering controller.
Figure 11A:
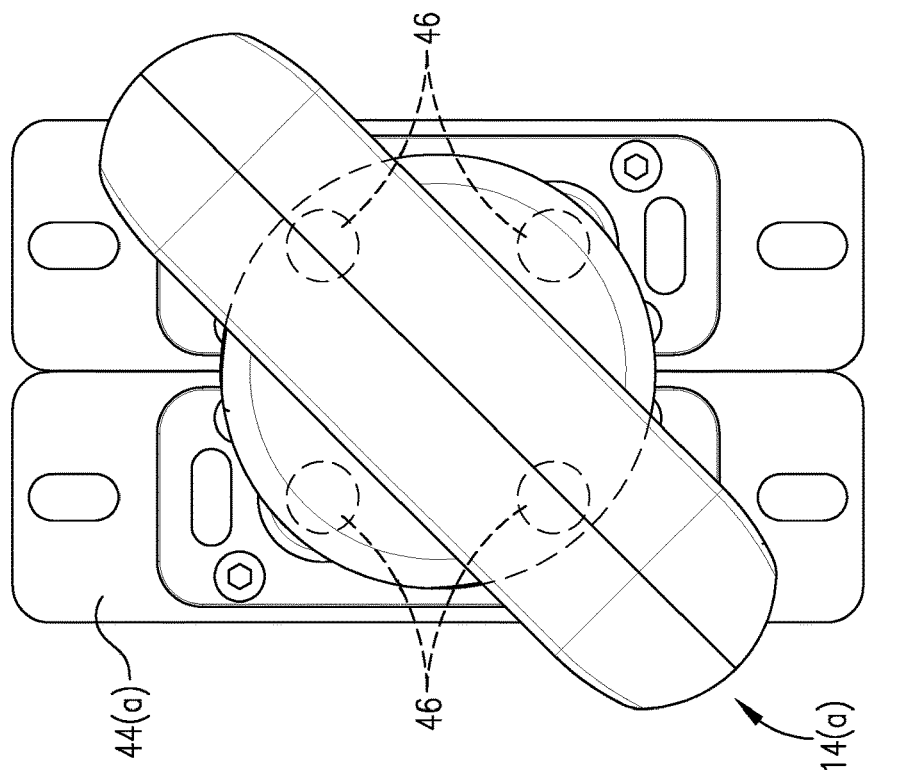
FIG. 11a is a top plan view of the steering control assembly from FIG. 5, particularly showing the steering control assembly rotated in a counterclockwise position.

As shown in FIGS. 11*a* (top view) and 11*b* (side view), rotating the steering handle 14(*a*) counterclockwise on the twist axis 76, without shifting the steering handle 14(*a*) forward or rearward on the tilt axis 74, depresses the front right and rear left depressible buttons 46. When the front right and rear left depressible buttons 46 are depressed an equal amount and the front left and rear right depressible buttons 46 are not depressed, as shown in FIGS. 11*a* and 11*b*, the right and left traction elements 16 rotate at substantially the same speed, with the right traction element 16 rotating forward and the left traction element 16 rotating rearward. In this configuration, the loader 10 turns counterclockwise without traveling forward or backward. It should be understood that the further the front right and rear left depressible buttons 46 are depressed the faster the left and right traction elements 16 will rotate so as to increase the turning speed or severity of the turn (i.e., the left turn) of the loader 10. As such, when the steering handle 14(a) is rotated counterclockwise a full amount forward, the rear left and front right depressible buttons 46 will be depressed a maximum amount, and the left and right traction elements 16 will rotate oppositely at a maximum rate to cause the loader to turn in a counterclockwise direction at a maximum speed/severity.

When the steering handle 14(a) is simultaneously tilted (forward or rearward) and twisted (clockwise or counterclockwise), both the speed (fast or slow) and direction of travel (forward, backward, and turning) of the loader 10 are simple and intuitively controlled by the operator using a single one hand on the steering handle 14(a).

Figure 12:
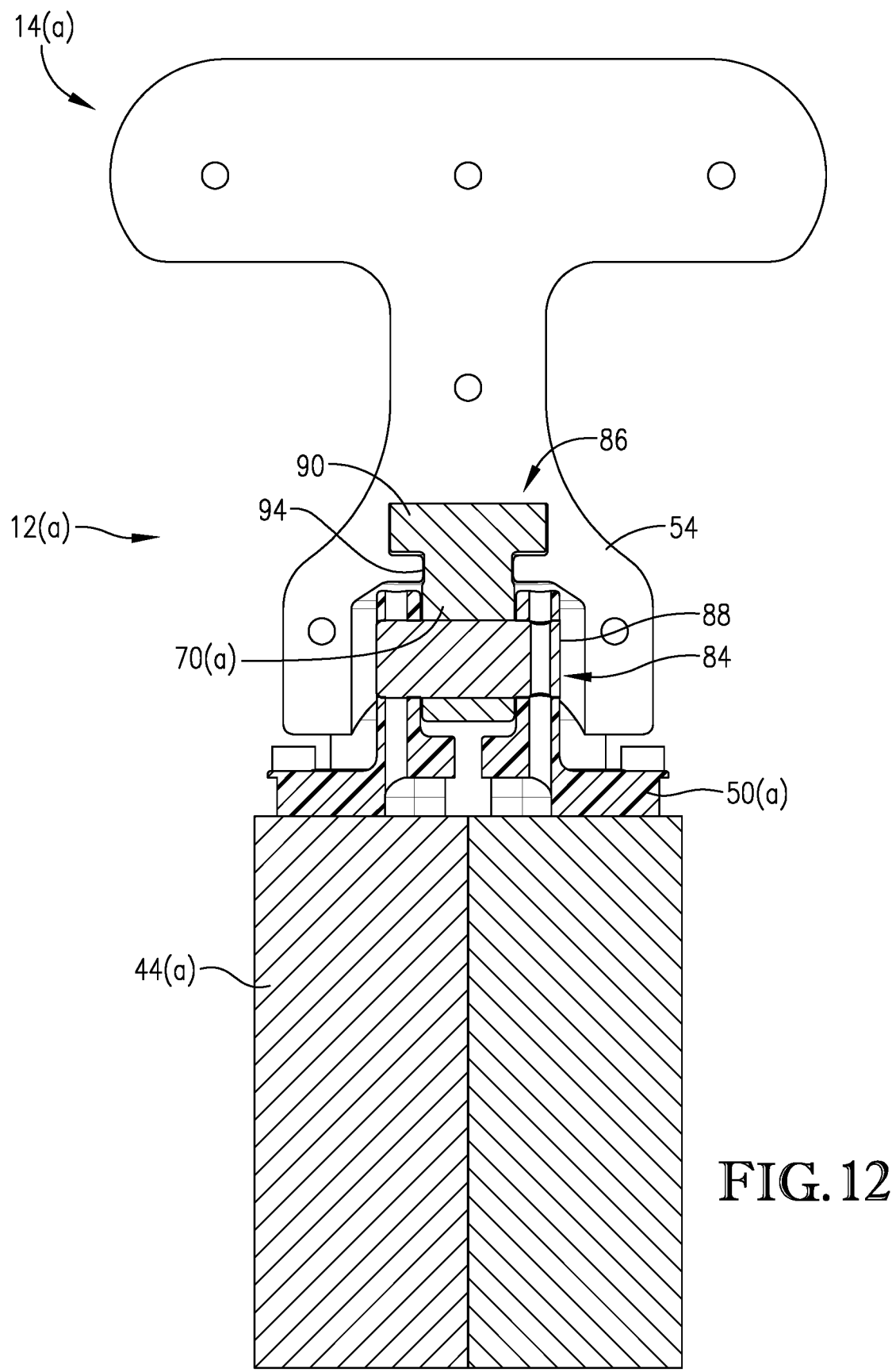
FIG. 12 is a vertical cross section of the steering control assembly from FIG. 5.
Figure 13A:
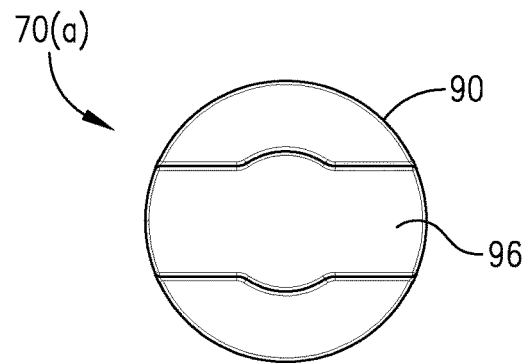
FIG. 13a is a top plan view of a handle connection member from the steering control assembly of FIG. 12.
Figure 13B:
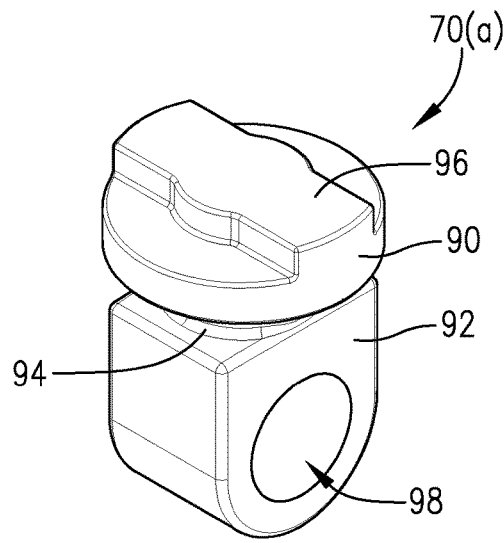
Figure 13C:
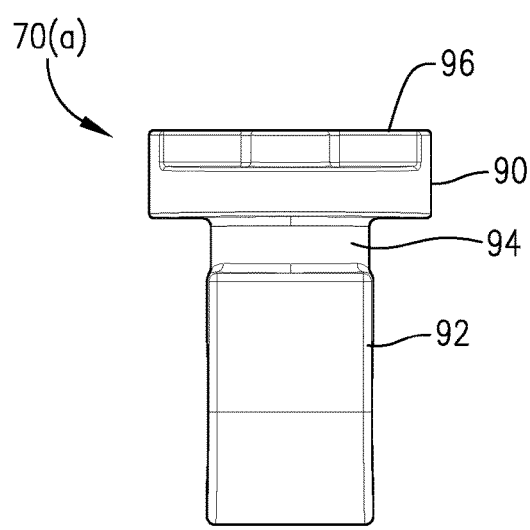
FIG. 13c is a side elevation view of the handle connection member from FIGS. 13a and 13b.
Figure 13D:
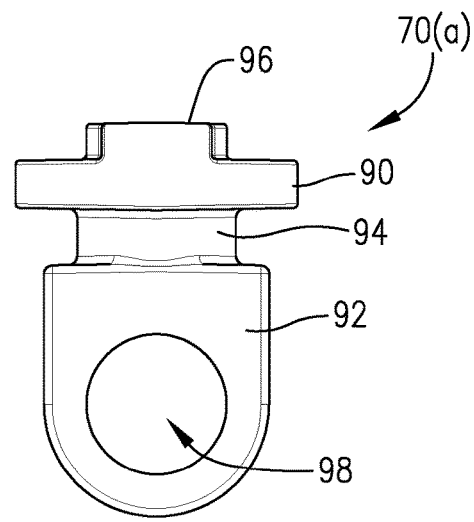
FIG. 13d is an additional side elevation view of the handle connection member from FIGS. 13a, 13b, and 13c.

FIG. 12 is a sectional view of the steering handle 14(a) and steering controller 44(a) in the neutral position. FIG. 12 also shows how the steering handle 14(a) is coupled to the steering controller 44(a) by a tilt hinge 84 and a twist hinge 86. The tilt hinge 86 is configured to permit the steering handle 14(a) to rotate relative to the steering controller 44(a) (and the panel support structure 22) on the tilt axis 74 (See FIG. 7b), while the twist hinge 86 is configured to permit the steering handle 14(a) to rotate relative to the steering controller 44(a) (and panel support structure 22) on the twist axis 76 (See FIG. 7b).

The tilt hinge 84 can be formed by the handle securement structure 50(a), the handle connection member 70(a), and a hinge pin 88. More specifically, the handle securement structure 50(a) is rigidly coupled to the steering controller 44(a), the handle connection member 70(a) is connected to the steering handle 14(a), and the hinge pin 88 extends through openings in both the handle connection member 70(a) and the handle securement structure 50(a) to secure the components together in a manner that permits the tilting of the handle connection member 70(a) relative to the handle securement structure 50(a) on the tilt axis 74. Generally, the hinge pin 88 is aligned with the tilt axis 74.

The twist hinge 76 can be formed by the handle connection member 70(a) and the base 54 of the steering handle 14(a). More specifically, the handle connection member 70(a) includes a head 90 that is received in an internal cavity of the base 54 in a manner that permits the steering handle 14(a) to rotate relative to the head 90 and the handle connection member 70(a) on the twist axis 76. Generally, the head 90 and/or the handle connection member 70(a) are aligned with the twist axis 76. Correspondingly, the upright extension member 56 of the steering handle 14(a) will generally be aligned with and/or centered on the twist axis 76, while the crossmember 52 is perpendicular to the twist axis 76 with the twist axis 76 extending through the crossmember 52.

As such, the steering control assembly 12(a) may comprises a handle connection assembly for attaching the steering handle 14(a) to the panel support structure 22, whereby said handle connection assembly comprises the tilt hinge 84 and the twist hinge 86. The tilt hinge 84 is configured to permit the steering handle 14(a) to tilt forward and rearward relative to the panel support structure 22 on a tilt axis 74, while the twist hinge 86 is configured to permit the steering handle 14(a) to twist clockwise and counterclockwise relative to the panel support structure 22 on a twist axis 76.

FIGS. 13a-d provides various views of the handle connection member 70(a) that can be received within the internal cavity of the steering handle 14(a). Specifically, FIGS. 13a-d show that the handle connection member 70(a) can includes an extension member 92, a neck 94, the head 90, and a projection 96.

The extension member 92 includes an attachment opening 98 through which the hinge pin 84 can extend, so as to couple the handle connection member 70(a) to the steering controller 44(a) (and the panel support structure 22) via the handle securement structure 50(a) in a manner that permits pivoting of the handle connection member 70(a) relative to the panel support structure 50(a) on the tilt axis 74. The head 90 is configured to be received in a broad portion of the internal cavity of the steering handle 14(a), as illustrated in FIG. 12. The neck 94 is configured to be received in a narrow portion of the internal cavity in a manner that prevents the head 90 from being pulled out of the internal cavity but permits rotation of the steering handle 14(a) relative to the handle connection member 70(a) on the twist axis 76. The projection 96 of the handle connection member 70(a) extends upwardly from the head 90 and is received in an upper portion of the internal cavity of the steering handle 14(a).

Figure 14:
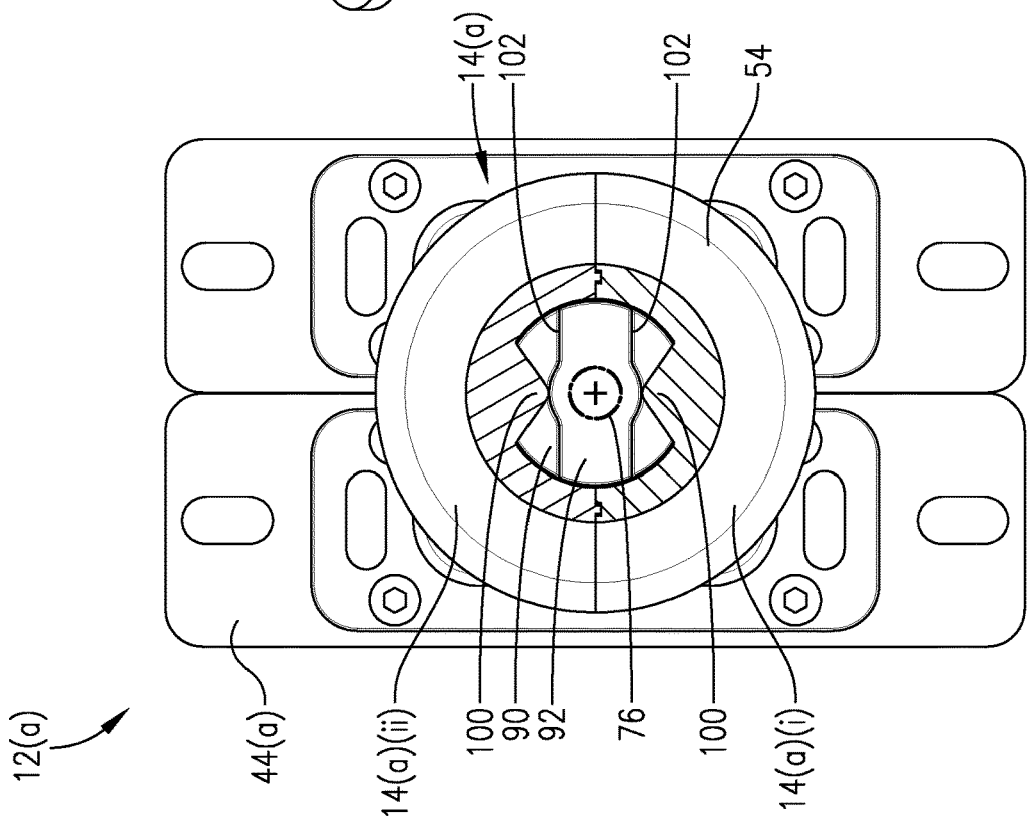
FIG. 14 is a top plan view of a horizontal cross section of the steering control assembly from FIG. 12.

FIG. 14 is a horizontal cross-sectional view cut through the steering handle 14(a) at the very top of the internal cavity that receives the head 90 of the handle connection member 70(a). FIG. 14 shows that the steering handle 14(a) includes stops 100 that extend into the broad portion of the internal cavity at the same level as the projection 92 of the handle connection member 70(a). These stops 100 may form part of a twist stop assembly, which are configured to be positioned within the steering handle 14(a) to restrict rotation of the steering handle 14(a) on the twist axis 76 within a certain range. When the steering handle 14(a) is fully twisted in a clockwise or counterclockwise manner, stop surfaces 102 of the projection 92 contact the stops 100 and prevent further rotation of steering handle 14(a) relative to the handle connection member 70(a), steering controller 44(a), and panel support structure 22.

In some embodiments, the steering handle 14(a) is rotatable on the twist axis 76 through a twist range of motion that is between 15 and 80 degrees, or 25 and 60 degrees, or 30 and 50 degrees. In addition, the steering handle 14(a) is shiftable on the tilt axis through a tilt range of motion that is between 15 and 80 degrees, or 25 and 60 degrees, or 30 and 50 degrees.

Stating the above differently, in some embodiments, the handle connection assembly comprises a panel attachment piece (e.g., the handle securement structure and/or upper portions of the steering controller 44(a)), a handle attachment piece (e.g., handle connection member 70(a)), and a tilt hinge pin 88. The panel attachment piece can be attached to the panel support structure 22. The handle attachment piece can be attached to the handle 14(a). And the steering handle 14(a) and the panel attachment pieces are coupled to one another by the tilt hinge pin 88, with the tilt hinge pin 88 extending along the tilt axis 74. In some embodiments, the panel attachment piece will be rigidly coupled to the panel support structure 22, and the handle attachment piece will be rotatably coupled to the steering handle 14(a). The handle attachment piece includes a upper broadened head. The steering handle 14(a) defines an internal head-receiving cavity within which said broadened head is received to thereby couple the handle attachment piece to the steering handle 14(a). As a result, the steering handle is rotatable relative to the broadened head on the twist axis 76. Finally, the broadened head includes at least one projection, and the steering handle 14(a) includes at least one stop member. Contact between the projection and the stop member restricts rotation of the steering handle 14(*a*) relative to the panel support structure 22 on said twist axis 76.

Figure 15:
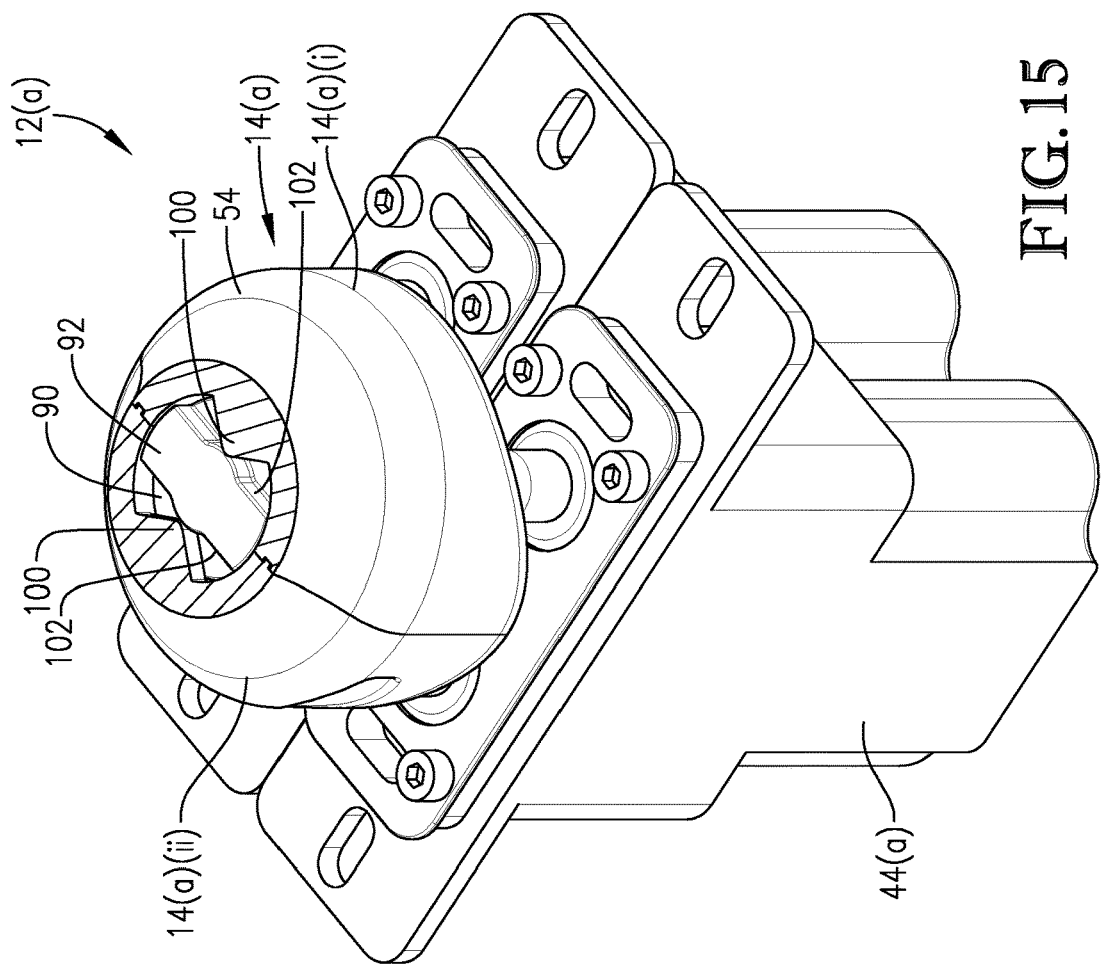
FIG. 15 is a perspective view of the horizontal cross section of the steering control assembly from FIG. 14.

As shown in FIGS. 14 and 15, as well as FIG. 7*b*, the steering handle 14(*a*) can be formed of two halves—a first handle half 14(*a*)(i) and a second handle half 14(*a*)(ii). With the steering handle 14(*a*) in the neutral, upright position, the first handle half 14(*a*)(i) may be rearward of the second handle half 14(*a*)(ii) and separated by a vertical plane. The first handle half 14(*a*)(i) may be secured to the second handle half 14(*a*)(ii) via one or more forward/rearward extending fasteners. In some embodiments, the first handle half 14(*a*)(i) and the second handle half 14(*a*)(ii) may be mirror images of each other. In some specific embodiments, at least interior portions of the first handle half 14(*a*)(i) and the second handle half 14(*a*)(ii) (e.g., the internal cavity) may be mirror images of each other. In some embodiments, the crossmember 52, the upright extension member 56, and the base 54 of the first handle half 14(*a*)(i) may be integrally formed from a unitary piece of material, while the crossmember 52, the upright extension member 56, and the base 54 of the second handle half 14(*a*)(ii) may be integrally formed from a unitary piece of material.

Forming the handle 14(*a*) in two halves, allows for easy attachment of the handle connection member 70(*a*) to the steering handle 14(*a*) by (i) placing the head 90 of the handle connection member 70(*a*) in the portion of the internal chamber defined by the first handle half 14(*a*)(i), (ii) aligning the second handle half 14(*a*)(ii) with the first handle half 14(*a*)(i) so that the head is the portion of the internal chamber defined by the second handle half 14(*a*)(ii), and (iii) coupling the two handle halves 14(*a*)(i) and 14(*a*)(ii) to one another (e.g., via the fasteners) while the head 90 is received in the internal cavity that is cooperatively formed by the first handle half 14(*a*)(i) and the second handle half 14(*a*)(ii).

Figure 16:
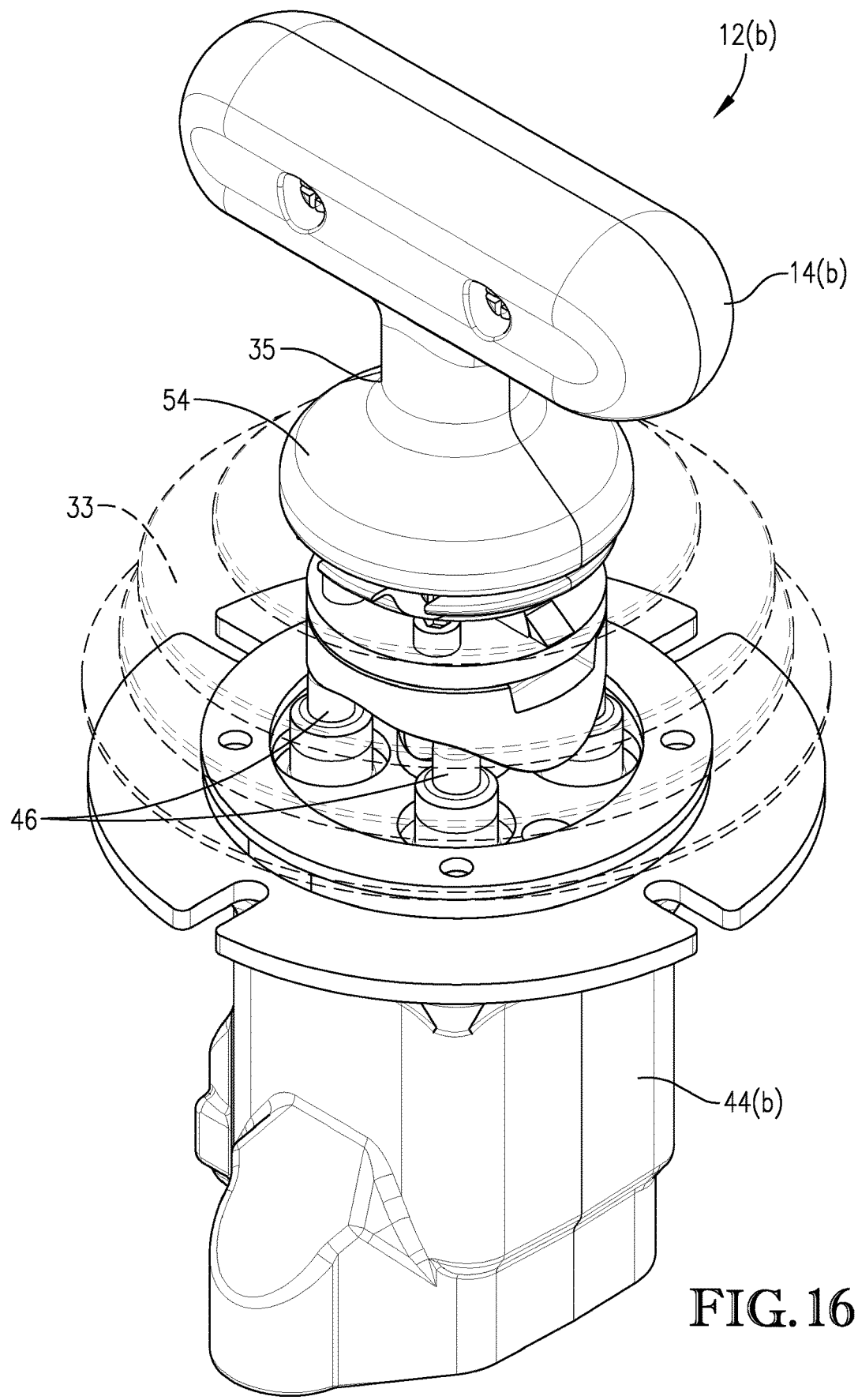
FIG. 16 is a perspective view of a steering control assembly according to additional embodiments of the present invention.

Another embodiment of a steering control assembly 12(*b*) is illustrated in FIG. 16. Broadly, the steering control assembly 12(*b*) will include a steering handle 14(*b*) secured to a steering controller 44(*a*). The steering control assembly 12(*b*) may include many of the same components and may be configured to perform many of the same functions as the steering control assembly 12(*a*) discussed above. As with steering control assembly 12(*a*), the steering control assembly 12(*b*) is configured such that steering handle 14(*b*) can be manually manipulated forwardly and rearwardly and can be manually twisted in clockwise and counterclockwise directions with respect to the steering controller 44(*b*) to selectively depress buttons 46 to control the speed and direction of rotation of the left and right traction elements 16 of the loader 10.

Figure 17:
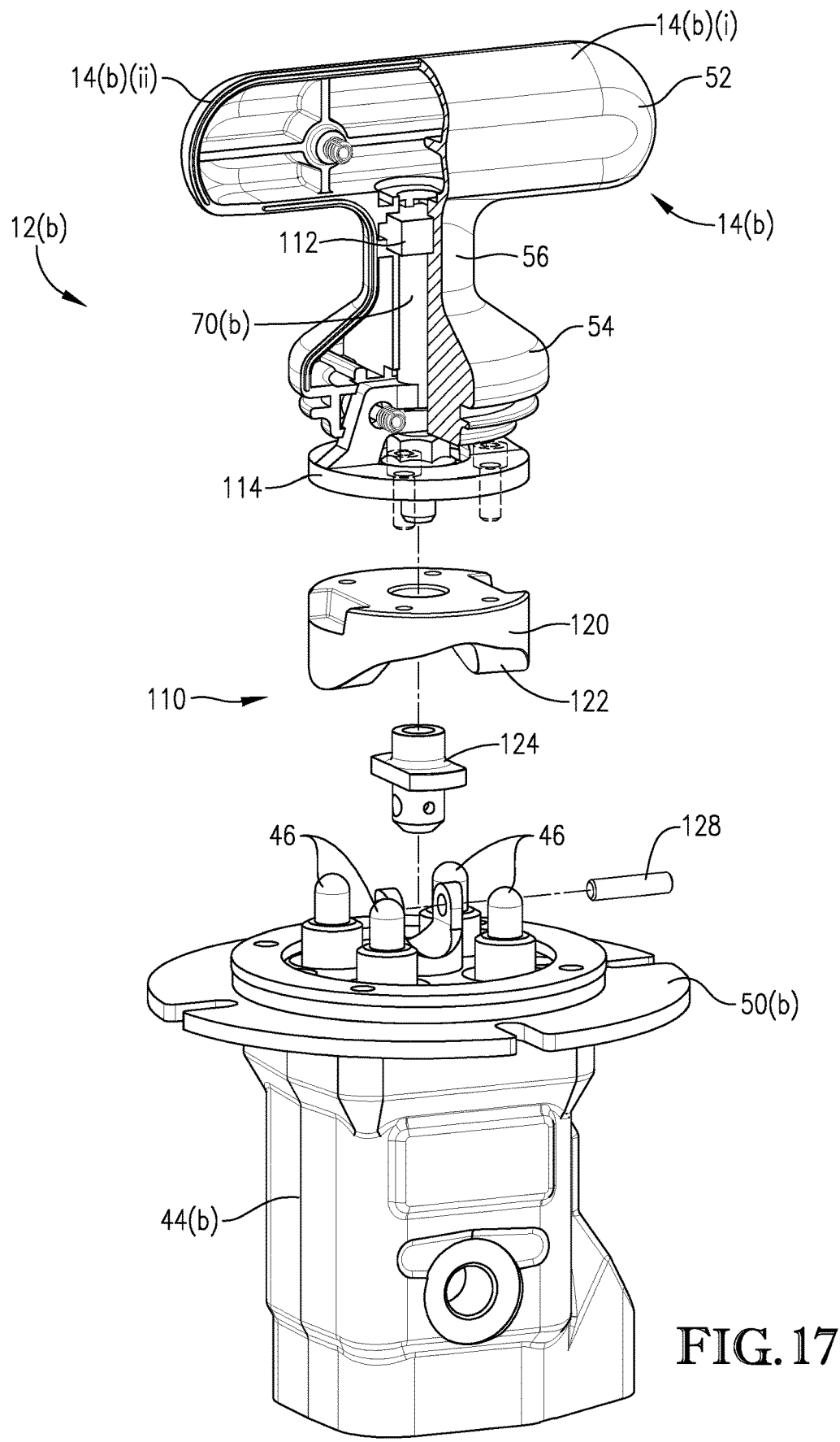
FIG. 17 is an exploded view of the steering control assembly from FIG. 16, with a portion of a steering handle cut away to show a handle connection assembly.

As shown in FIG. 17, the steering control assembly 12(*b*) comprises a handle connection assembly 110 that is used to secure the steering handle 12(*b*) to the steering controller 44(*b*). The handle connection assembly 110 may include a handle connection member 70(*b*) configured to extend upward into the internal cavity of the steering handle 14(*b*) in a similar manner as the handle connection member 70(*a*). However, the handle connection member 70(*b*) may be significantly longer than the handle connection member 70(*a*), such that the handle connection member 70(*b*) may extend into the internal cavity of the steering handle 14(*b*) up through base 54, through the upright extension member 56 and to (or into) the crossmember 52. The handle connection member 70(*b*) may include a head 112 at its upper end and an annular base 114 at its lower end.

The handle connection assembly 110 may additionally include a pedestal 120 to which the handle connection member 70(*b*) may be rigidly secured. In particular, the annular base 114 of the handle connection member 70(*b*) may be secured to an upper surface of the pedestal 120 via fasteners. Notably, a bottom of the pedestal may be formed with a curved bottom surface 122, which is formed similarly to the curved bottom surface 57 of the base 54 of the steering handle 14(*a*) discussed above. Specifically, the curved bottom surface 122 ma include a substantially flat front section, a substantially flat rear section, a pair of left-side downwardly sloping sections, and a pair of right-side downwardly sloping sections. As such, the left-side downwardly sloping sections are formed on the sides of a left downward projection of the pedestal 120, and the right-side downwardly sloping sections are formed on the sides of a right downward projection of the pedestal 120. As a result, the curved bottom surface 122 of the steering assembly 12(*b*) is formed on the handle connection assembly 110 that secures the steering handle 14(*b*) to the steering controller 44(*b*).

The handle connection assembly 110 may additionally include a tilt member 124, which is configured to secure the handle connection member 70(*b*) and the pedestal 120 to the steering controller 44(*b*). In particular as perhaps best illustrated by FIG. 18, The tilt member 124 may be secured to the pedestal 120 via a threaded fastener 126 and associated washer, which permit the pedestal 120 to rotate about a twist axis 76 with respect to the tilt member 124. As shown, the twist axis 76 will generally be aligned longitudinally with the threaded fastener 126, the tilt member 124, and the handle connection member 70(*b*). The tilt member 124 will be secured to a second embodiment of a handle securement structure 50(*b*) via a pivot pin 128. The pivot pin 128 will be held in place within the tilt member 124 via a set screw 129 extending through the tilt member 124 and into engagement with the pivot pin 128. With the pivot pin 128 securing the tilt member 124 to the handle securement structure 50(*b*), the pivot pin 128 will be aligned (and will present) the tilt axis 74. As illustrated in FIG. 17, the handle securement structure 50(*b*) is secured to the steering controller 40(*b*), such that the handle connection assembly 110 and the steering handle 14(*b*) are operably secured to the steering controller 44(*b*) (e.g., to depress associated buttons 46 as required).

Figure 20B:
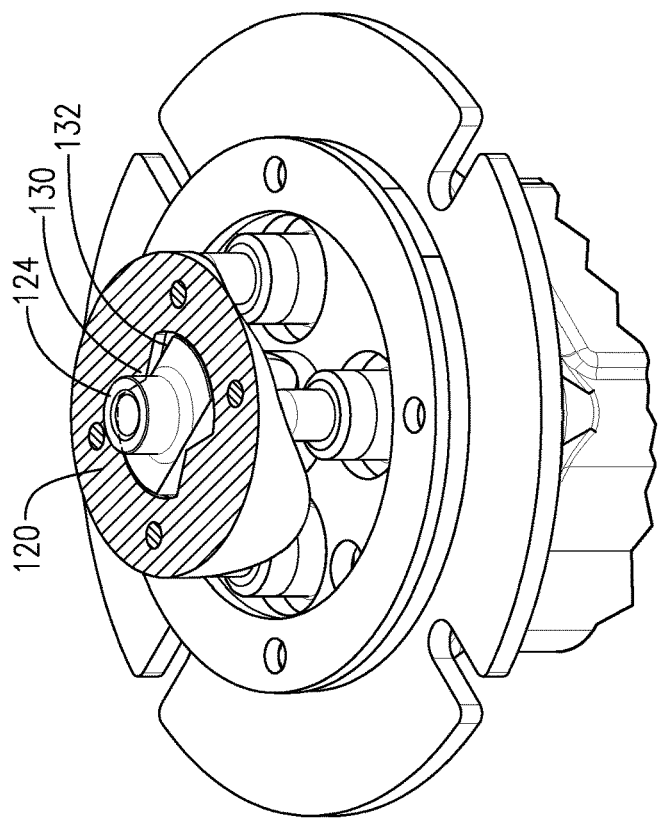
Figure 20A:
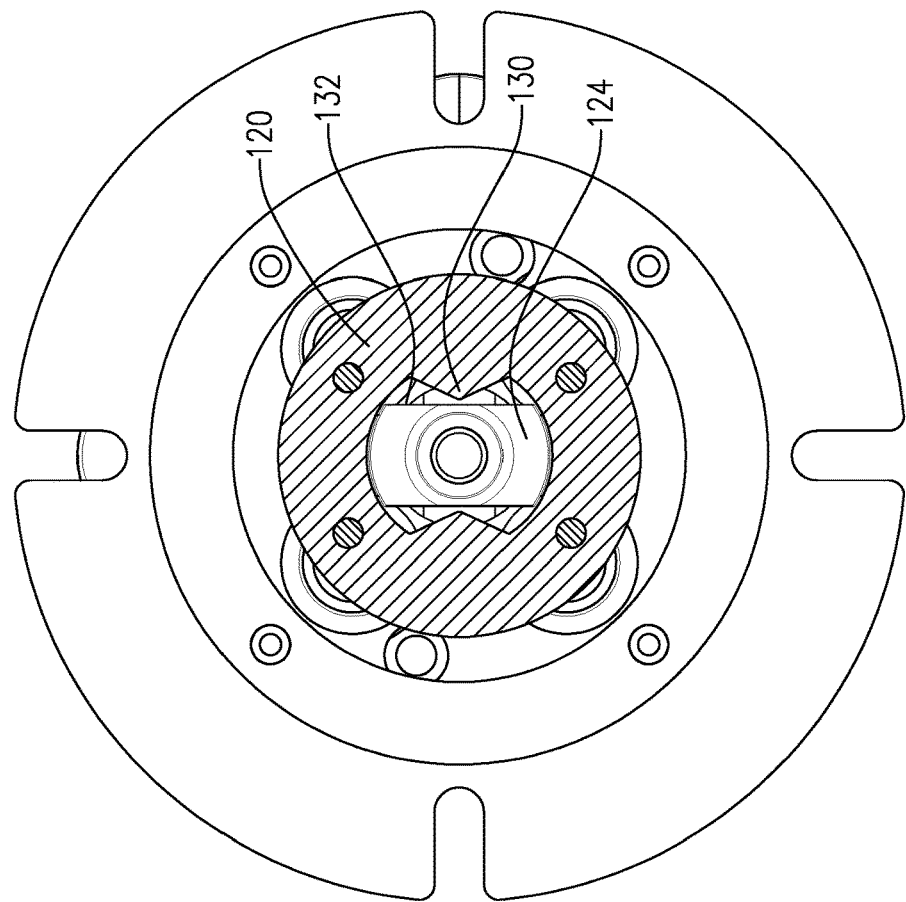
FIG. 20a is a top plan view of a horizontal cross section of the steering control assembly from FIG. 16.

Returning to the pedestal 120, as perhaps best shown by FIG. 19, the pedestal includes an internal cavity with a pair of inwardly-orientated, triangular-shaped stops 130, which may form part of a twist stop assembly. When the pedestal 120 is secured to the tilt member 124, the stops 130 will be positioned at the same level as stop surfaces 132 extending from the tilt member 124 (See stop surfaces 132 on FIG. 18). FIGS. 20(*a*) and 20(*b*) show a horizontal cross-sectional view cut through the pedestal 120 at the internal cavity that receives tilt member 124. The figures show that the pedestal 120 includes the stops 130 extending into the internal cavity at the same level as the stop surfaces 132 of the tilt member 124. These stops 130 are configured to restrict rotation of the steering handle 14(*b*) on the twist axis 76 within a certain range. When the steering handle 14(*b*) is fully twisted in a clockwise or counterclockwise manner, stop surfaces 132 of the tilt member 124 contact the stops 130 and prevent further rotation of steering handle 14(*b*) relative to the handle connection assembly 110 (including the handle connection member 70(*b*)), the steering controller 44(*b*), and panel support structure 22.

In some embodiments, the steering handle 14(*b*) is rotatable on the twist axis 76 through a twist range of motion that is between 15 and 80 degrees, or 25 and 60 degrees, or 30 and 50 degrees. In addition, the steering handle 14(*b*) is shiftable on the tilt axis 74 through a tilt range of motion that is between 15 and 80 degrees, or 25 and 60 degrees, or 30 and 50 degrees.

Figure 21:
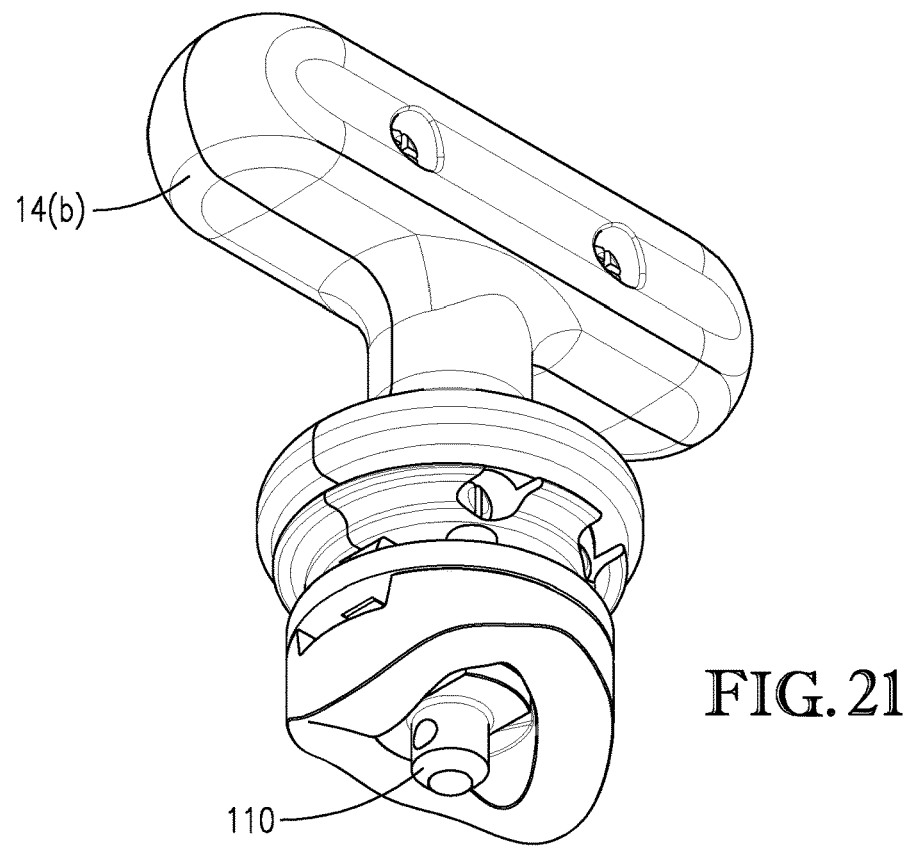
FIG. 21 is a bottom perspective view of a steering handle and a handle connection assembly from the steering control assembly from FIG. 16.
Figure 22:
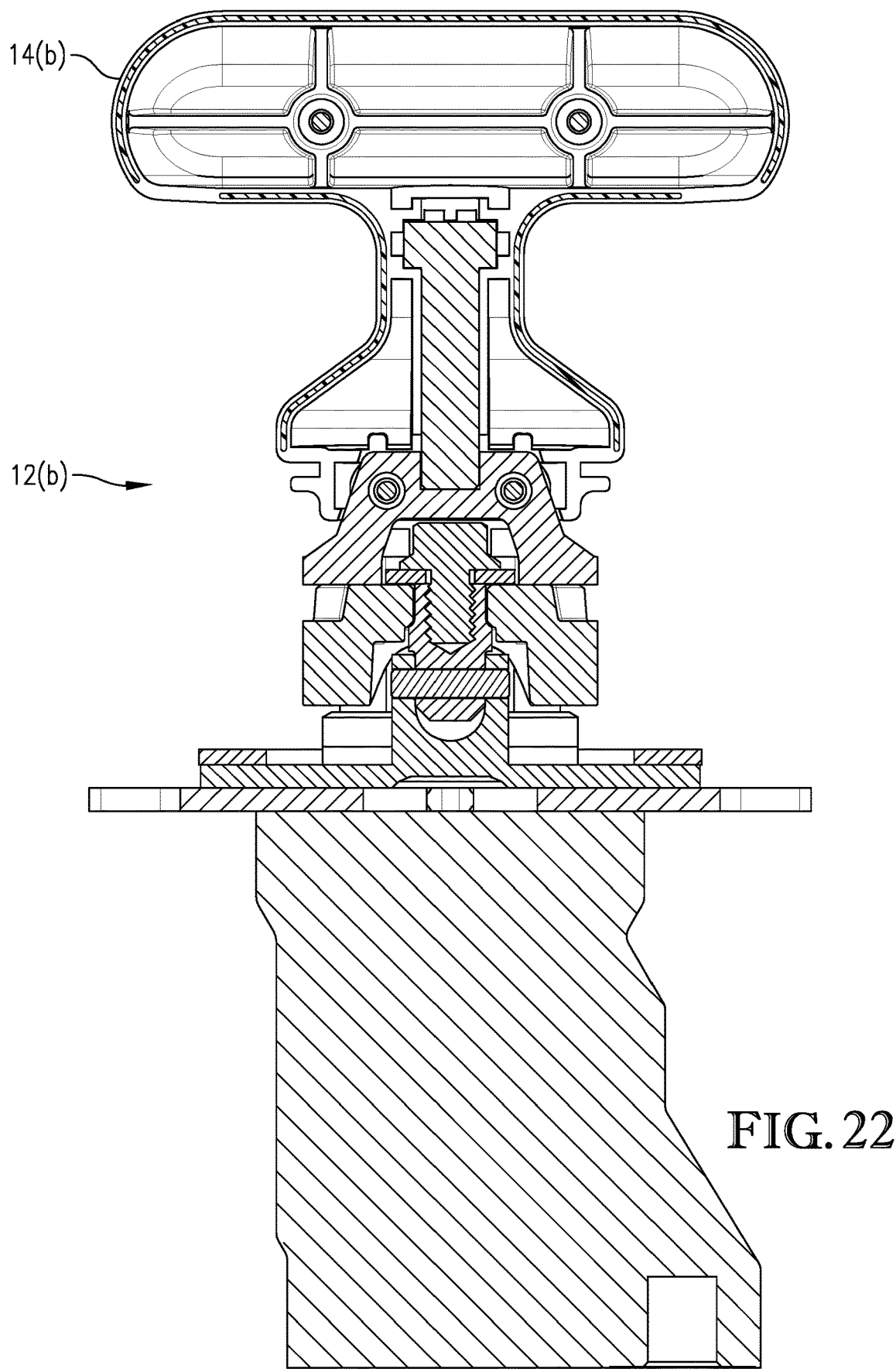
FIG. 22 is vertical cross section of the steering control assembly from FIG. 16.

FIG. 21 further illustrates the steering handle 14(*b*) coupled together with the handle connection assembly 110. FIG. 22 is a vertical cross-section showing how the components of the steering control assembly 12(*b*) fit together. FIGS. 23(*a*)-27(*b*) show how the steering handle 14(*b*) can be manipulated with respect to the steering controller 44(*b*) to control the loader 10.

Figure 23A:
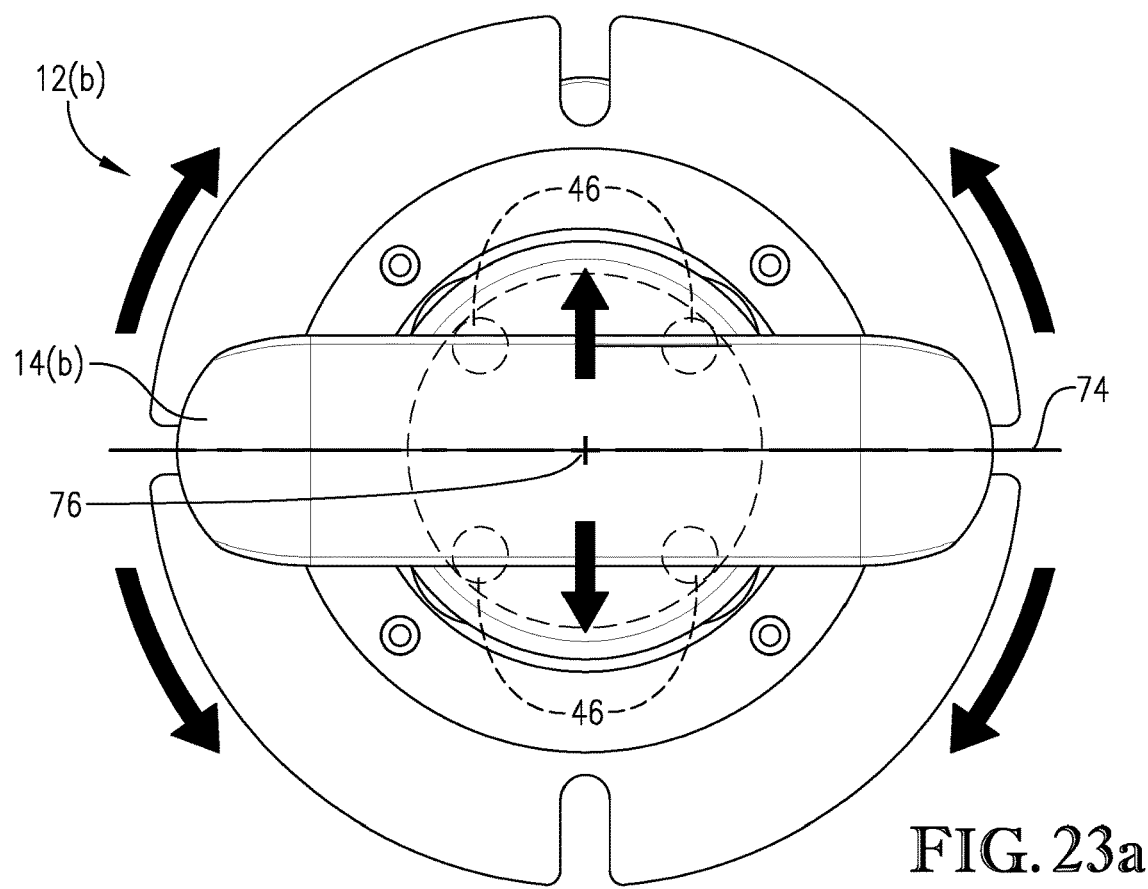
FIG. 23a is a top plan view of the steering control assembly from FIG. 16, particularly showing the steering control assembly in a neutral position.

FIGS. 23*a* (top view) and 23*b* (side view) show the steering control assembly 12(*b*) in a neutral position. When the steering control assembly 12(*b*) is in the neutral position, none of the depressible buttons 46 are depressed enough to cause rotation of the right or left traction elements 16 of the loader 10. The steering control assembly 12(*b*) is biased toward this neutral position so that if the operator of the loader 10 releases a hand grip on the steering handle 14(*b*), the loader 10 stops. Specifically, the steering controller 44(*b*) can includes the variable switch and a biasing mechanism for biasing the depressible buttons 46 upwardly, similar to that described for steering controller 44(*a*) above. When the steering handle 14(*a*) is not being manually manipulated out of the neutral position, all the depressible buttons 46 are fully extended and the steering handle 14(*b*) is maintained in the neutral position by the depressible buttons 46 pushing up against the substantially flat front and rear portions of the curved bottom surface 122 of the pedestal 120. In some embodiments, the steering controller 44(*b*) may be a hydraulic pilot control valve and movement of the depressible buttons 46 directly adjusts the flow of hydraulic fluid through the control valve to control direction and speed of the right and left traction elements 16 via the hydraulic motors.

Figure 23B:
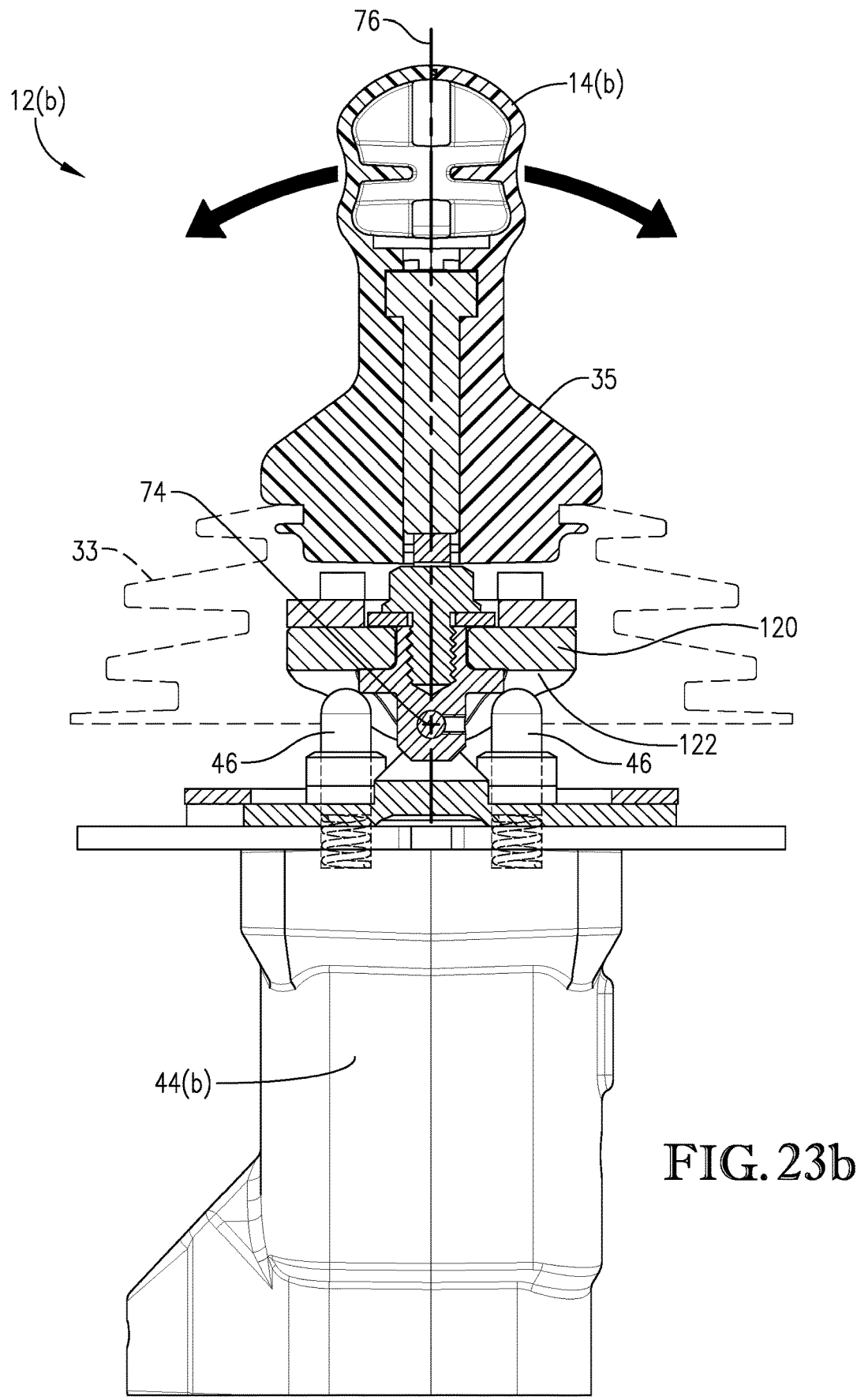
FIG. 23b is side elevation view of the steering control assembly from FIG. 23a, particularly showing a vertical cross section of a steering handle, a handle connection assembly, and a portion of a steering controller.

FIGS. 23*a* and 23*b* show that the steering handle 14(*b*) is connected to the steering controller 44(*b*) in a manner that allows the steering handle 14(*b*) to be shifted/tilted forward and rearward on tilt axis 74. Further, the steering handle 14(*b*) is connected to the steering controller 44(*b*) in manner that allows the steering handle 14(*b*) to be rotated/twisted clockwise and counterclockwise on twist axis 76. The tilt axis 74 and twist axis 76 are maintained substantially perpendicular to one another, even during shifting or rotating of the steering handle 14(*b*).

Figure 24B:
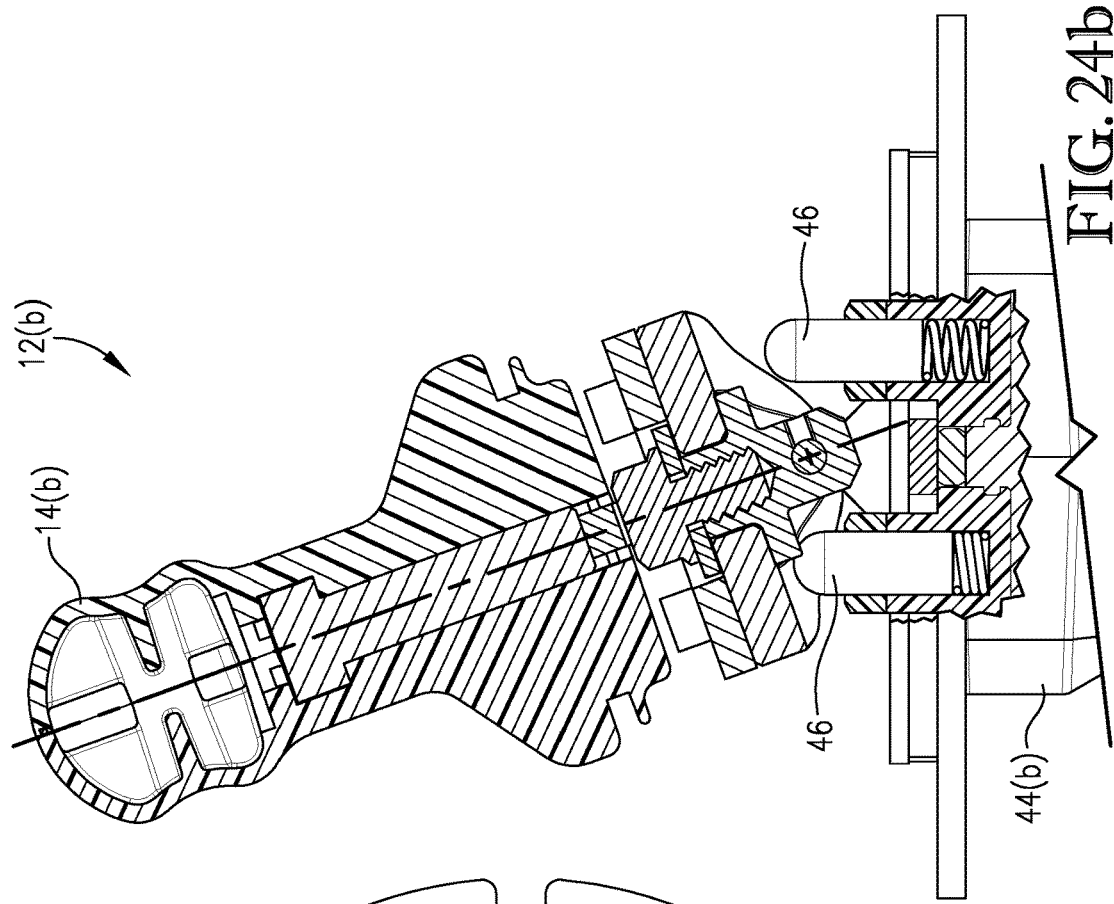
FIG. 24b is side elevation view of the steering control assembly from FIG. 24a, particularly showing a vertical cross section of a steering handle, a handle connection assembly, and a portion of a steering controller.
Figure 24A:
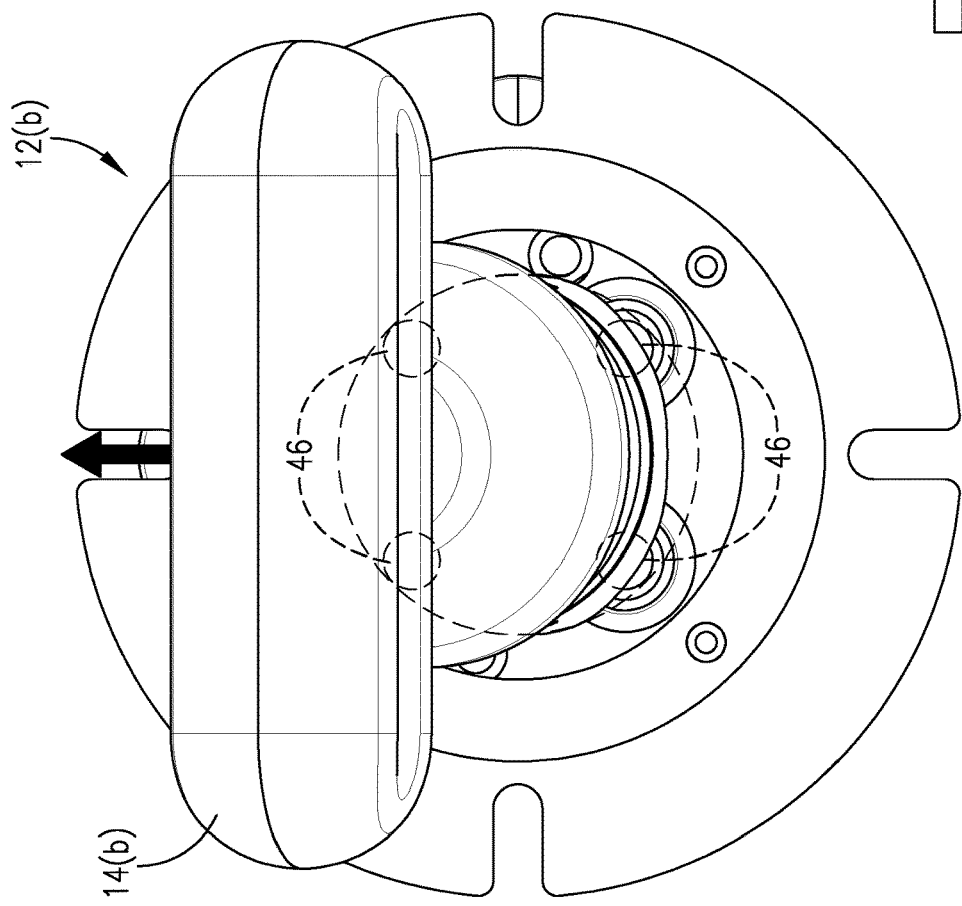
FIG. 24a is a top plan view of the steering control assembly from FIG. 16, particularly showing the steering control assembly shifted in a forward position.
Figure 26B:
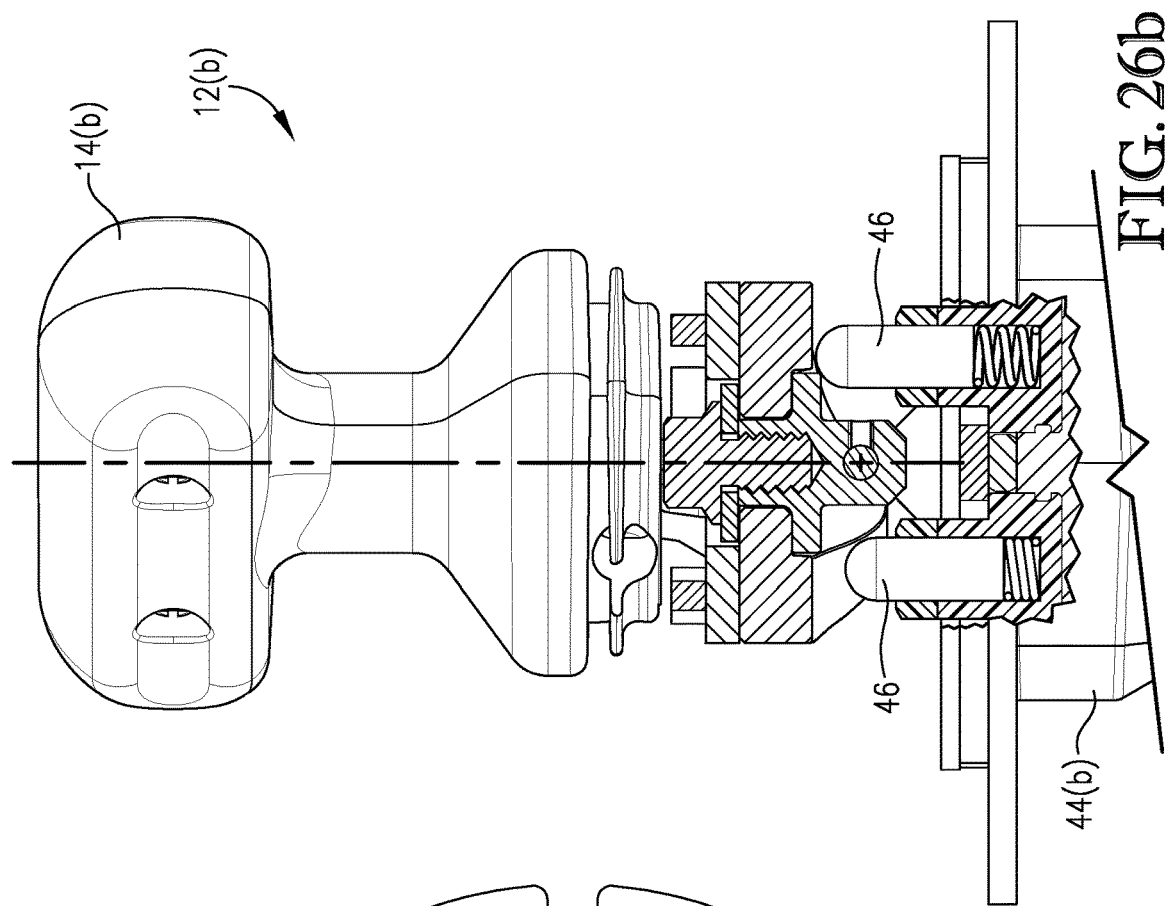
FIG. 26b is side elevation view of the steering control assembly from FIG. 26a, particularly showing a vertical cross section of a steering handle, a handle connection assembly, and a portion of a steering controller.
Figure 26A:
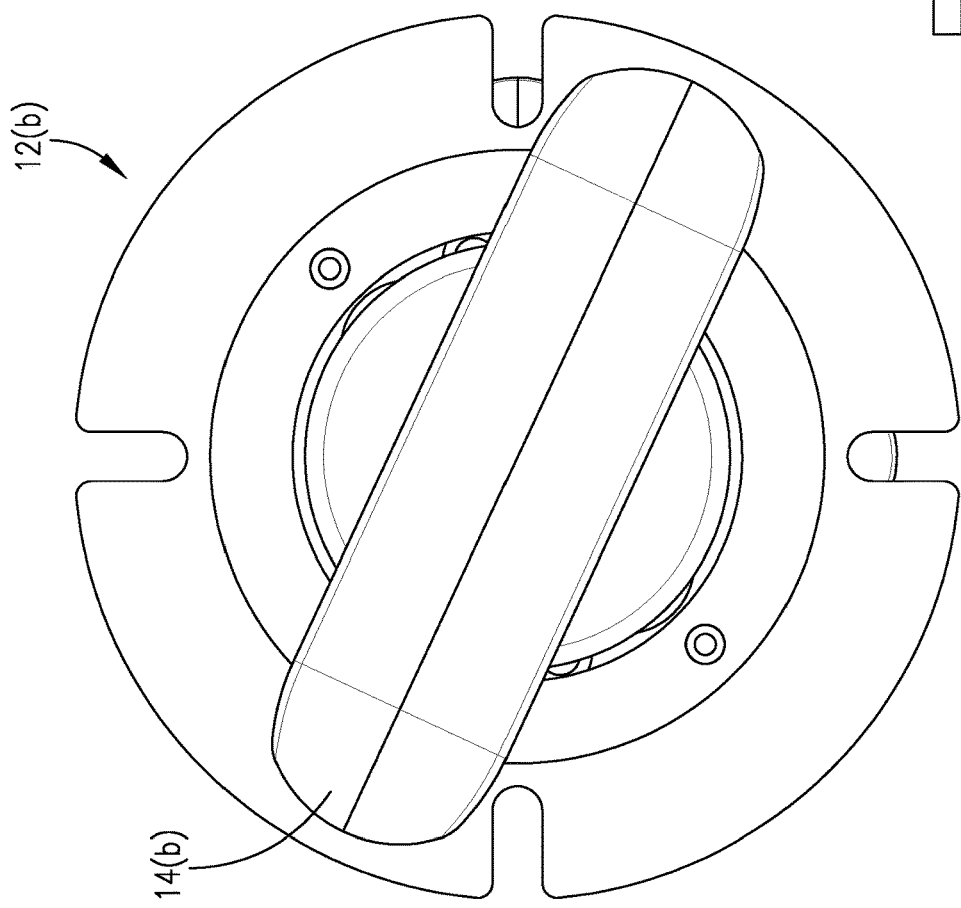
FIG. 26a is a top plan view of the steering control assembly from FIG. 16, particularly showing the steering control assembly rotated in a clockwise position.
Figure 27B:
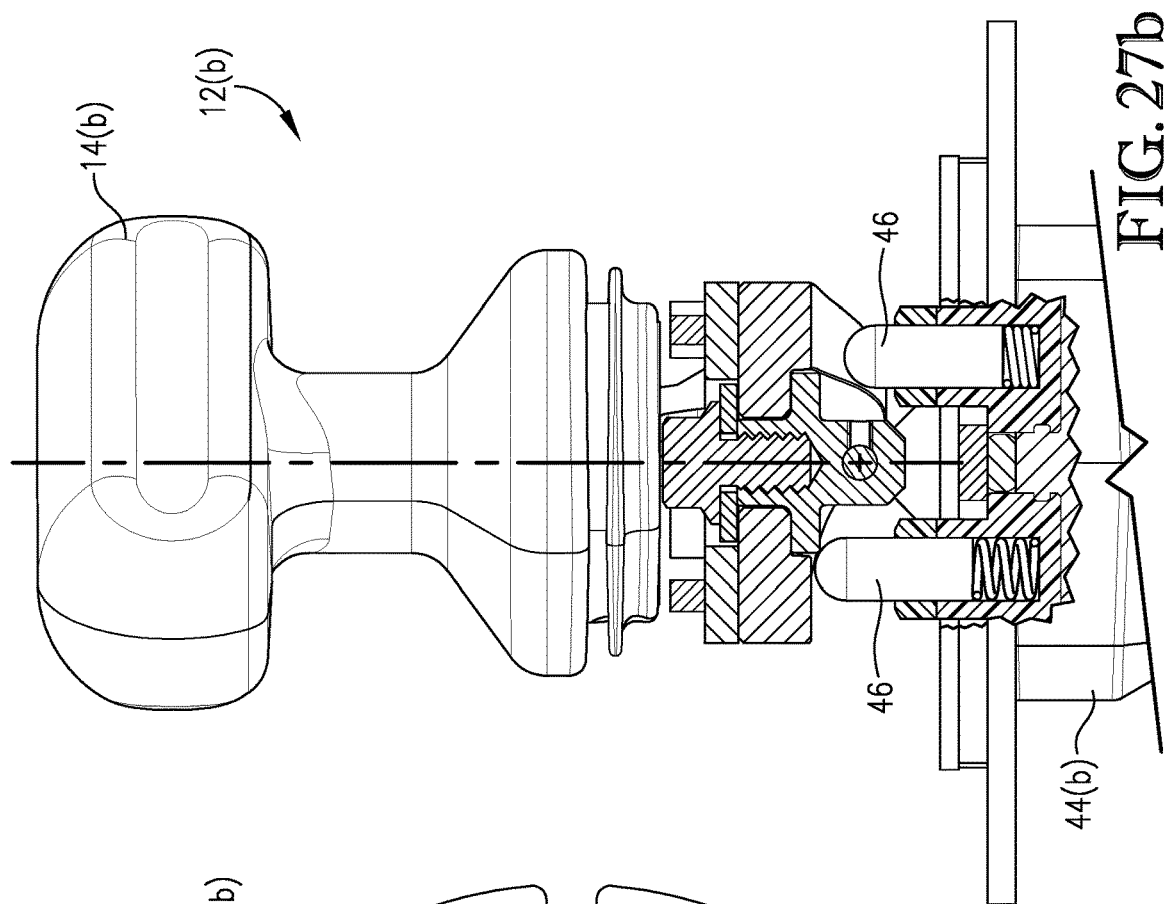
FIG. 27b is side elevation view of the steering control assembly from FIG. 27a, particularly showing a vertical cross section of a steering handle, a handle connection assembly, and a portion of a steering controller.
Figure 27A:
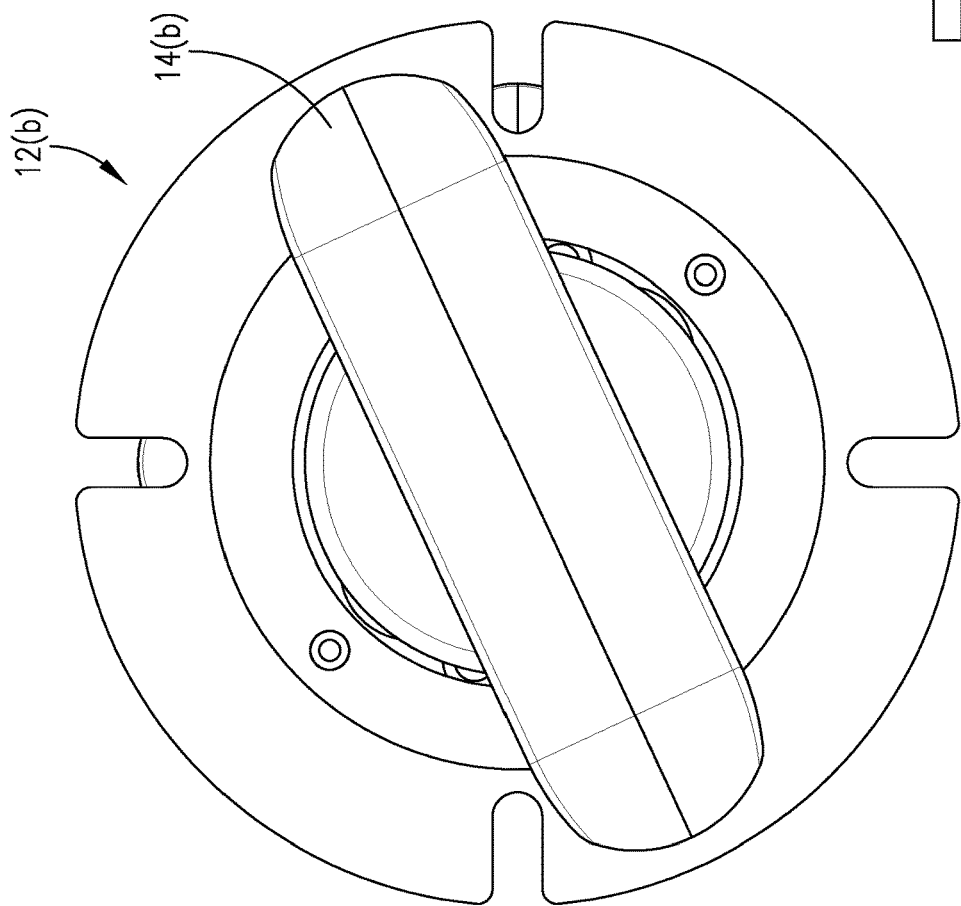
FIG. 27a is a top plan view of the steering control assembly from FIG. 16, particularly showing the steering control assembly rotated in a counterclockwise position.

Certain of the remaining functionality of the steering control assembly 12(*b*) is similar to that described above for steering control assembly 12(*a*). As shown in FIGS. 24*a* (top view) and 24*b* (side view) steering handle 14(*b*) can be tilted forward such that the right and left traction elements 16 rotate forward at substantially the same speed, so the loader 10 travels straight forward. As shown in FIGS. 25*a* (top view) and 25*b* (side view), the steering handle 14(*b*) can be shifted rearward causing the right and left traction elements 16 rotate reward at substantially the same speed, so the loader 10 travels straight backward (i.e., in reverse). As shown in FIGS. 26*a* (top view) and 26*b* (side view), the steering handle 14(*b*) clockwise such that the right and left traction elements 16 rotate at substantially the same speed, with the left traction element 16 rotating forward and the right traction element 16 rotating rearward. In this configuration, the loader 10 turns clockwise without traveling forward or backward. Finally, as shown in FIGS. 27*a* (top view) and 27*b* (side view), the steering handle 14(*b*) can be rotated counterclockwise such that the right and left traction elements 16 rotate at substantially the same speed, with the right traction element 16 rotating forward and the left traction element 16 rotating rearward. In this configuration, the loader 10 turns counterclockwise without traveling forward or backward.

When the steering handle 14(*b*) is simultaneously tilted (forward or rearward) and twisted (clockwise or counterclockwise), both the speed (fast or slow) and direction of travel (forward, backward, and turning) of the vehicle are easily and intuitively controlled by the operator using a single one hand on the steering handle 14(*b*).

As shown in FIG. 17, the steering handle 14(*b*) can be formed of two halves—a first handle half 14(*b*)(i) and a second handle half 14(*b*)(ii). The first handle half 14(*a*)(i) may be secured to the second handle half 14(*a*)(ii) via one or more forward/rearward extending fasteners or a snap fit-connection. Forming the handle 14(*b*) in two halves, allows for easy attachment of the handle connection assembly 110, including the handle connection member 70(*b*) to the steering handle 14(*b*) by (i) placing the handle connection member 70(*b*) in the internal chamber defined by the first handle half 14(*b*)(i), (ii) aligning the second handle half 14(*b*)(ii) with the first handle half 14(*b*)(i) so that the handle connection member 70(*b*) is the portion of the internal chamber defined by the second handle half 14(*b*)(ii), and (iii) coupling the two handle halves 14(*b*)(i) and 14(*b*)(ii) to one another (e.g., via the fasteners) while the handle connection member 70(*b*) is received in the internal cavity that is cooperatively formed by the first handle half 14(*b*)(i) and the second handle half 14(*b*)(ii).

Figure 28B:
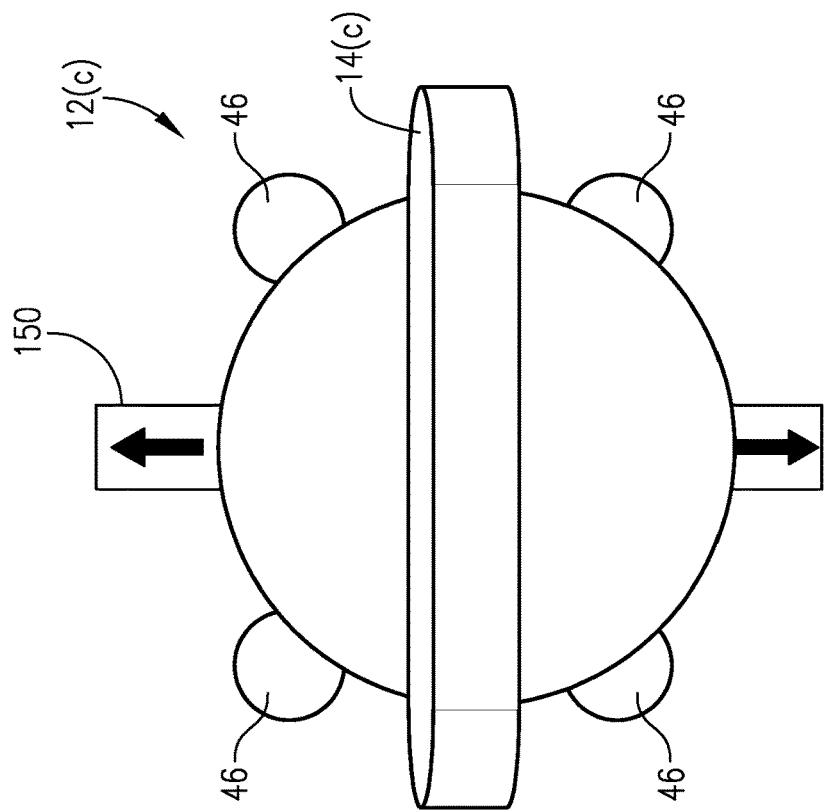
Figure 28A:
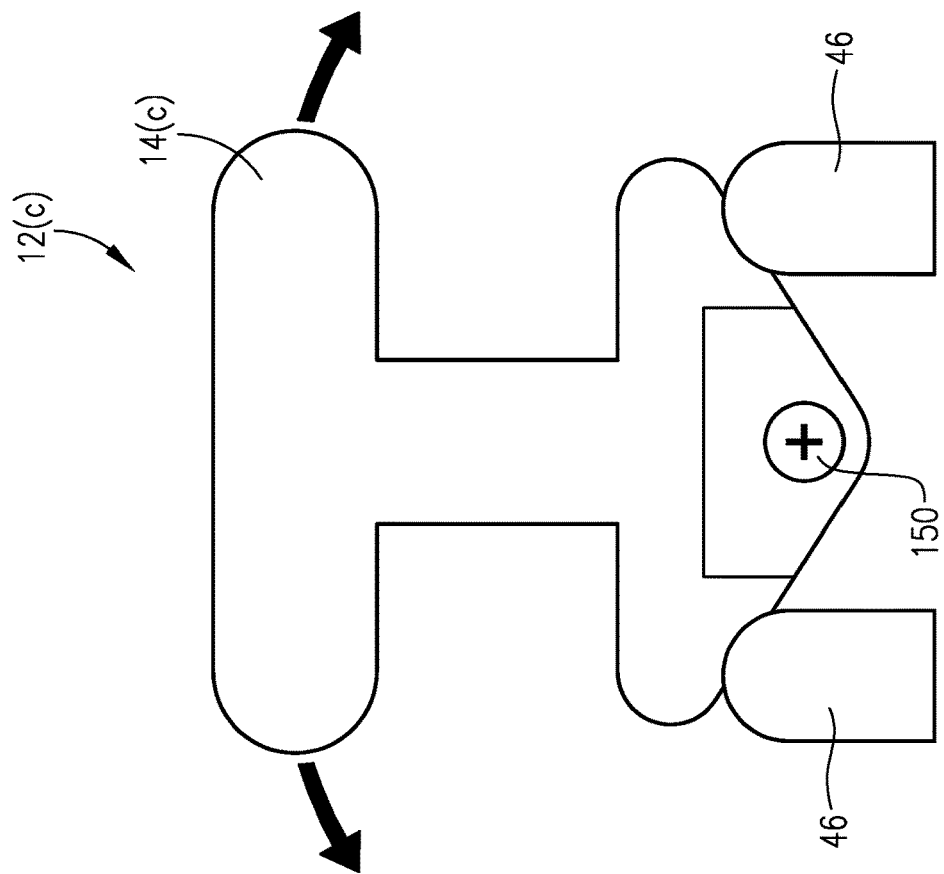
FIG. 28a is a side elevation schematic view of an additional embodiment of a steering control assembly in which a steering handle is configured to forwardly and rearwardly translated along a rail.

Although the steering handle assemblies 12(*a*), 12(*b*) described above are configured to pivot/rotate on two axes (i.e., a tilt axis 74 and the twist axis 76), it should be understood that other embodiments of a steering handle assembly may be configured to include a steering handle that can translate forward, rearward, and/or side-to-side relative to a steering controller, rather than pivot/rotate relative to the steering controller. For example, in the embodiment depicted FIGS. 28*a* and 28*b*, an embodiment of a steering handle assembly 12(*c*) is illustrated with a steering handle 14(*c*) mounted on a rail 150 that permits forward and rearward translation of the steering handle 14(*c*) relative to a steering controller (identified by the depressible buttons 46). In such a configuration, forward and rearward movement of the loader 10 can be controlled by sliding the steering handle 14(*c*) forward and rearward on the rail 150, while turning of the loader 10 can be controlled by tilting the steering handle 14(*c*) left and right on an axis that is coextensive with the rail 150.

Figure 29:
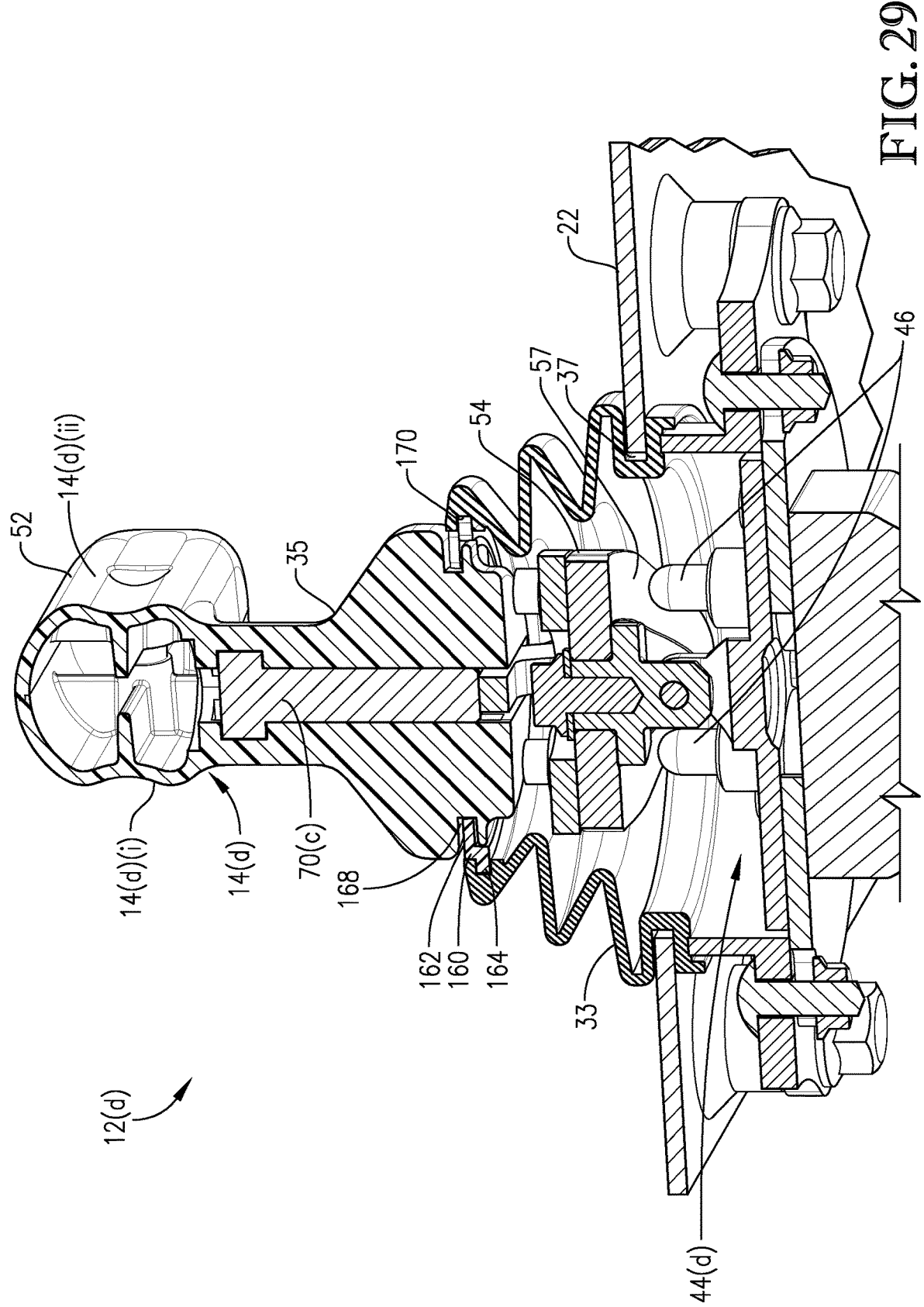
FIG. 29 is a vertical sectional view of an alternative steering control assembly employing an attachment ring to connect a flexible protective cover to the shaft of the steering handle.
Figure 30:
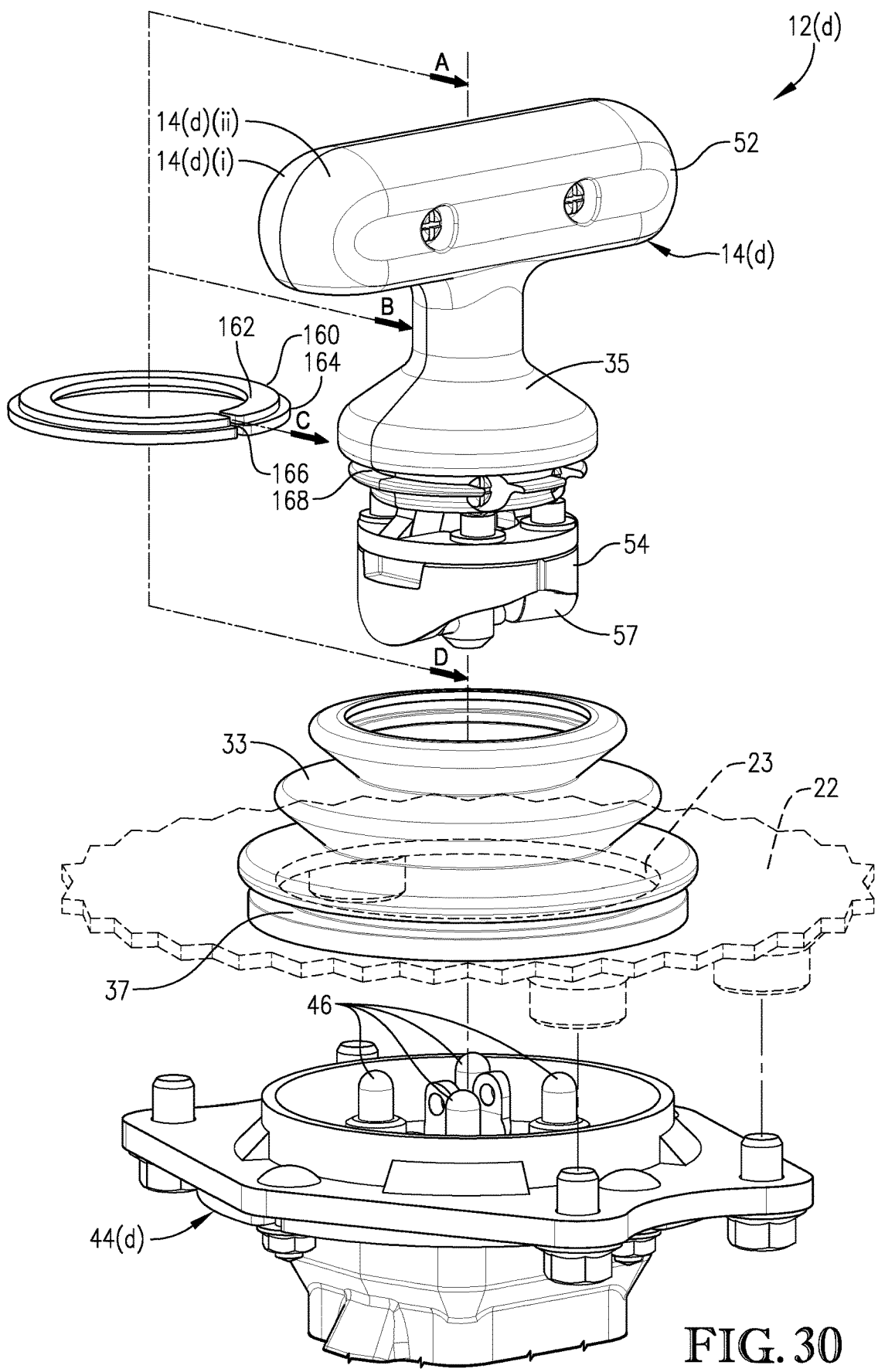
FIG. 30 is an exploded view of the steering control assembly from FIG. 29 and showing how the attachment ring can be connected to the shaft of the steering handle.
Figure 31:
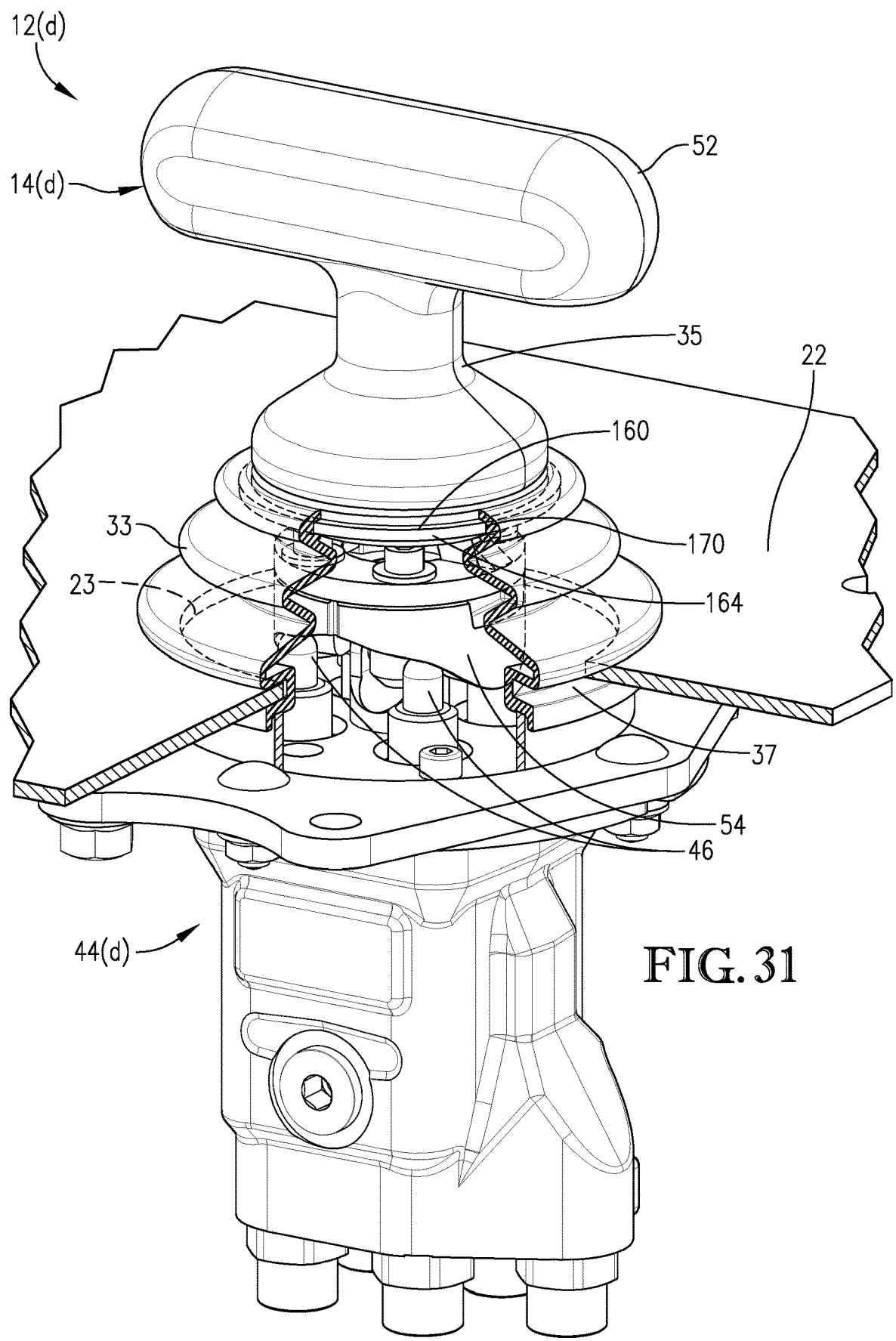
FIG. 31 is a partial cut-away view of the steering control assembly from FIGS. 29 and 30.

FIGS. 29-31 illustrate an alternative embodiment of a steering control assembly 12(*d*) having an attachment ring 160 that is used to connect an upper end of the flexible protective cover 33 (e.g., a rubber boot) to the shaft 35 of the T-shaped steering handle 14(*d*). As mentioned above, the protective cover 33 can be used to prevent dirt and debris from entering the steering controller 44(*d*) via an opening 23 in the panel support structure 22 through which the steering control assembly 12(*d*) extends.

In addition to functioning as an attachment mechanism for connecting the upper portion of the flexible protective cover 33 to the shaft 35, the attachment ring 160 can, optionally, function as a bushing that allows for rotation of the shaft 35 within the protective cover 33, so that the shaft 35 can be twisted clockwise and counterclockwise without requiring corresponding rotation and deformation of the protective cover 33.

When the attachment ring 160 acts as a bushing between the shaft 35 and the protective cover 33, wear on the protective cover 33 caused by repeated twisting/deformation of the protective cover 33 can be minimized. This bushing feature of the attachment ring 160 can also facilitate smoother and easier twisting of the steering handle 14(d) because the protective cover 33 provides little or no resistance to twisting the steering handle 14(d); rather, the steering handle 14(d) simply twists relative to the protective cover 33 without causing substantial deformation of the protective cover 33. Further, use of the attachment ring 160 can help facilitate the return of the steering handle 14(d) to the neutral position after the steering handle 14(d) has been twisted, thereby ensuring that the steering handle 14(d) does not get stuck in a non-neutral, twisted position.

To facilitate its use as a bushing, the attachment ring 160 can be formed of a low friction material. Such low friction material can having a coefficient of static friction of less than 1.0, less than 0.5, less than 0.3, less than 0.2, or less than 0.1 and/or a coefficient of dynamic friction of less than 0.5, less than 0.4, less than 0.3, less than 0.2, less than 0.15, less than 0.1, or less than 0.05. The foregoing coefficient of friction values are measured using ASTM D1894. Additionally, it may be necessary for the attachment ring 160 to be formed of a flexible, resilient material that permits expansion of the attachment ring 160 in order to increase the inner diameter of the attachment ring 160 during installation.

In certain embodiments, the attachment ring 160 can be at least partially formed of a polyamide and/or a fluoropolymer material. The polyamide can be nylon and the fluoropolymer can be polytetrafluoroethylene (PTFE). In other embodiments, the attachment ring 160 is formed predominately (>50% by weight) of nylon. In still other embodiments, the attachment ring 160 is formed predominately (>50% by weight) of PTFE.

As perhaps best illustrated in FIG. 30, the attachment ring 160 includes an inner portion 162 for engaging the shaft 35 of the steering handle 14(d) and an outer portion 164 for engaging the protective cover 33. In one embodiment, the attachment ring 160 includes a slit 164 that can be widened/opened by deforming/expanding the attachment ring 160, thereby allowing the attachment ring to be install around the shaft 35.

As perhaps best shown in FIGS. 29 and 30, the shaft 35 can have a circumferential recess 168 formed therein for receiving the inner portion 162 of the attachment ring 160, thereby preventing the attachment ring 160 from sliding up and down the shaft 35. FIG. 30 shows several options ("A"-"D") for how the attachment ring 160 can be connected to the shaft 35 of the steering handle 14(d) at the circumferential recess 168. Option "A" includes the following steps: (a) sliding the attachment ring 160 over the handle connection member 70(c) (shown in FIG. 29) before attaching the first handle half 14(d)(i) and second handle half 14(d)(ii) to the handle connection member 70(c); (b) while the attachment ring 160 surrounds the lower portion of the handle connection member connecting the two handle halves 14(d)(i), 14(d)(ii) to one another and to the handle connection member 70(c); (c) expanding the attachment ring 160 so that the inner diameter of the attachment ring 160 is increased enough to fit over the portion of the shaft below the circumferential recess 168, (d) moving the expanded attachment ring 160 up into vertical alignment with the circumferential recess 168 of the shaft 35; and (e) allowing the attachment ring 160 to return to its unexpanded state, thereby reducing the inner diameter of the attachment ring 160 such that the inner portion 162 of the attachment ring 168 is received in the circumferential recess 168. Option "B" includes the following steps: (a) expanding the attachment ring 160 so that the slit 166 of the attachment ring 160 is wide enough to fit over the narrowest portion of the shaft 35; (b) further expanding the attachment ring 160 so that the inner diameter of the attachment ring 160 is increased enough to fit over the lower portion of the shaft 35 just above the circumferential recess 168, (c) moving the expanded attachment ring 160 down into vertical alignment with the circumferential recess 168 of the shaft 35; and (d) allowing the attachment ring 160 to return to its unexpanded state, thereby reducing the inner diameter of the attachment ring 160 such that the inner portion 162 of the attachment ring 168 is received in the circumferential recess 168 of the shaft 35. Option "C" includes the following steps: (a) aligning the attachment ring 160 with the circumferential recess 168 in the shaft 35; (b) expanding the attachment ring 160 so that the slit 166 of the attachment ring 160 is wide enough to permit the attachment ring 160 to slide over shaft 35 at the circumferential recess 168; (c) inserting the attachment ring 160 in the circumferential recess 168, and (d) allowing the attachment ring 160 to return to its unexpanded state, thereby reducing the inner diameter of the attachment ring 160 such that the inner portion 162 of the attachment ring 168 is received in the circumferential recess 168. Option "D" includes the following steps: (a) before attaching the steering handle 14(d) to the steering controller 44(d), sliding the attachment ring 160 up around the base 54; (b) expanding the attachment ring 160 so that the inner diameter of the attachment ring 160 is increased enough to fit over the base 54 and lower portion of the shaft 35, (c) moving the expanded attachment ring 160 up into alignment with the circumferential recess 168 of the shaft 35; and (e) allowing the attachment ring 160 to return to its unexpanded state, thereby reducing the inner diameter of the attachment ring 160 such that the inner portion 162 of the attachment ring 168 is received in the circumferential recess 168.

Once the attachment ring 160 has been installed on the shaft 35, the upper opening in the flexible protective cover 33 can be widened by stretching/deforming the upper portion of the protective cover 33 so that it can be place over, around, and in engagement with the outer portion 164 of the attachment ring 160.

In the embodiment depicted in FIGS. 29-31, the upper inside portion of the protective cover 33 has an interior recess 170 (shown in FIGS. 29 and 31) formed therein for receiving the outer portion 164 of the attachment ring 160. When the upper portion of the protective cover 33 surrounds the attachment ring 160 and the outer portion 164 of the attachment ring 160 is received in interior recess 170 of the protective cover 33, the portion of the protective cover 33 that surrounds the attachment ring 160 remains stretched/flexed/tensioned and exerts a radially inward compressive force on the attachment ring 160. The inward compressive force imparted on the attachment ring 160 by the protective cover 33 can (1) eliminate or minimize the size of the slit 166 in the attachment ring 160, (2) hold the inner portion 162 of the attachment ring 160 in the circumferential recess 168 of the shaft 35, (3) hold the outer portion 164 of the attachment ring 160 in the interior recess 170 of the protective cover 33, (4) inhibit rotation of the attachment ring 160 relative to the protective cover 33, and (5) prevent the upper end of the protective cover 33 from sliding up or down relative to the shaft 35 of the steering handle 14(d).

As shown in FIGS. 29-31, the protective cover 33 can also include a lower circumscribing cover recess 37 for connecting the bottom of the protective cover 33 to the panel support structure 22 at the opening 23 in the panel support structure 22. The flexibility of the protective cover 33 allows it to be attached to the panel support structure by simply (a) deforming the bottom of the protective cover 33 to have a smaller diameter than the opening 23, (b) aligning the lower circumscribing cover recess 37 with the panel support structure 22, (c) allowing the bottom of the protective cover 33 to expand to its normal shape with edges of the panel support structure 22 being receive in the cover recess 37, thereby attaching the bottom of the protective cover 33 to the panel support structure 22 in a manner that prevents dirt and debris from passing through the opening 23 and into contact with the steering controller 44(d).

What is claimed is:

1. A vehicle steering assembly for controlling movement of a vehicle having independently rotatable left and right ground-engaging traction elements, the vehicle comprising a control panel within reach of an operator of the vehicle, the control panel comprising a panel support structure for supporting one or more control or display mechanisms of the vehicle, the steering assembly comprising:
    a T-shaped steering handle extending above the panel support structure, wherein the steering handle comprises an upright shaft and a laterally extending cross-member rigidly coupled to the upright shaft;
    a steering controller positioned at least partly below the panel support structure, wherein the upright shaft comprises a base that actuates the steering controller;
    a flexible protective cover extending around and attached to the shaft, wherein the flexible protective cover is configured to prevent dust and debris from entering the controller at the base of the shaft,
    wherein the steering handle is shiftable relative to the panel support structure in forward and rearward directions to thereby cause corresponding forward and rearward rotation of both of the left and right traction elements,
    wherein the steering handle is rotatable relative to the panel support structure in clockwise and counterclockwise directions to thereby cause a change in the relative speeds and directions of rotation of the left and right traction elements, and
    an attachment ring for attaching the flexible protective cover to the shaft, wherein the flexible protective cover is stretched around the attachment ring to thereby exert a compressive force on the attachment ring.

2. The vehicle steering assembly of claim 1, wherein the shaft includes a circumferential recess for attaching the flexible protective cover to the shaft.

3. The vehicle steering assembly of claim 2, wherein an upper portion of the flexible protective cover is received in the circumferential recess to thereby attach the flexible protective cover to the shaft.

4. The vehicle steering assembly of claim 1, wherein, when the steering handle is rotated relative to the panel support structure, the flexible protective cover is not deformed.

5. The vehicle steering assembly of claim 1, wherein the attachment ring is positioned around the outside of the shaft and inside the flexible protective cover.

6. The vehicle steering assembly of claim 1, wherein the attachment ring is rotatably attached to the shaft.

7. The vehicle steering assembly of claim 1, wherein the shaft includes a circumferential recess for attaching the flexible protective cover to the shaft, wherein the attachment ring includes an inner portion received in the circumferential recess and an outer portion engaging the flexible protective cover.

8. The vehicle steering assembly of claim 7, wherein the flexible protective cover includes an upper internal recess, wherein the outer portion of the attachment ring is received in the upper internal recess of the flexible protective cover.

9. The vehicle steering assembly of claim 8, wherein the compressive force holds (i) the outer portion of the attachment ring in the upper internal recess of the flexible protective cover and (ii) the inner portion of the attachment ring in the circumferential recess of the shaft.

10. The vehicle steering assembly of claim 1, wherein the attachment ring comprises at least one of a polyamide and a fluoropolymer.

11. The vehicle steering assembly of claim 10, wherein the polyamide is nylon and the fluoropolymer is polytetrafluoroethylene (PTFE).

12. The vehicle steering assembly of claim 1, wherein the steering controller comprise a plurality of depressible buttons positioned generally below the steering handle, wherein the depressible buttons cooperatively control the speed and direction of rotation of the left and right traction elements, wherein the base of the shaft presents a lower surface having a curved topography, wherein the lower surface depresses the buttons when the steering handle is manipulated by the operator.

13. The vehicle steering assembly of claim 12, wherein the steering handle is biased toward a neutral position so that the steering handle automatically returns to the neutral position when not acted upon by the operator of the vehicle, wherein the depressible buttons include a front left button, a front right button, a rear left button, and a rear right button, wherein (i) moving the steering handle forward out of the neutral position, without twisting the steering handle, depresses the front left and front right buttons, (ii) moving the steering handle rearward out of the neutral position, without twisting the steering handle, depresses the rear left and rear right buttons, (iii) twisting the steering handle clockwise from the neutral position depresses the rear right and front left buttons, and (iv) twisting the steering handle counterclockwise from the neutral position depresses the front right and rear left buttons.

14. The vehicle steering assembly of claim 1, wherein the left and right traction elements each comprises tracks, wherein the vehicle is a compact utility loader.

15. A steering control assembly for controlling movement of a vehicle having left and right traction elements, the steering control assembly comprising:
    a steering handle comprising an upright shaft and a cross-member fixed to a top of the upright shaft, wherein the cross-member is configured for manual grasping by an operator of the vehicle;
    a steering controller actuated by the steering handle and configured to control movement of the vehicle based on the positioning of the steering handle by the operator;
    a flexible protective cover attached to the shaft and configured to prevent dust and debris from entering the steering controller; and
    an attachment ring for attaching the flexible protective cover to the shaft,
    wherein the attachment ring comprises an inner portion and an outer portion,
    wherein the shaft defines a circumferential recess receiving the inner portion of the attachment ring,
    wherein the flexible protective cover defines an interior recess receiving the outer portion of the attachment ring,
    wherein the attachment ring acts as a bushing between the shaft and the flexible protective cover so that the shaft can be rotated without causing corresponding rotation of the flexible protective cover, wherein the steering handle is biased toward a neutral position so that the steering handle automatically returns to the neutral position when not acted upon by the operator of the vehicle, wherein the steering control assembly is configured such that (i) tilting the steering handle forward from the neutral position toward a forward position causes forward rotation of both the left and right traction elements, (ii) tilting the steering handle rearward from the neutral position toward a rearward position causes rearward rotation of both the left and right traction elements, (iii) twisting of the steering handle clockwise from the neutral position toward a clockwise twisted position causes forward rotation of the left traction element and rearward rotation of the right traction element, and (iv) twisting of the steering handle counterclockwise from the neutral position toward a counterclockwise twisted position causes forward rotation of the right traction element and rearward rotation of the left traction element.

16. The steering control assembly of claim 15, wherein the flexible protective cover is stretched over the attachment ring and exerts a compressive force on the attachment ring to thereby hold (i) the inner portion of the attachment ring in the circumferential recess of the shaft and (ii) the outer portion of the attachment ring in the interior recess of the of the flexible protective cover.

17. A vehicle steering assembly for controlling movement of a vehicle having independently rotatable left and right ground-engaging traction elements, the vehicle comprising a control panel within reach of an operator of the vehicle, the control panel comprising a panel support structure for supporting one or more control or display mechanisms of the vehicle, the steering assembly comprising:
- a T-shaped steering handle extending above the panel support structure, wherein the steering handle comprises an upright shaft and a laterally extending crossmember rigidly coupled to the upright shaft;
- a steering controller positioned at least partly below the panel support structure, wherein the upright shaft comprises a base that actuates the steering controller;
- a flexible protective cover extending around and attached to the shaft, wherein the flexible protective cover is configured to prevent dust and debris from entering the controller at the base of the shaft,
- wherein the steering handle is shiftable relative to the panel support structure in forward and rearward directions to thereby cause corresponding forward and rearward rotation of both of the left and right traction elements,
- wherein the steering handle is rotatable relative to the panel support structure in clockwise and counterclockwise directions to thereby cause a change in the relative speeds and directions of rotation of the left and right traction elements, and
- an attachment ring for attaching the flexible protective cover to the shaft, wherein the attachment ring comprises at least one of a polyamide and a fluoropolymer.

18. The vehicle steering assembly of claim 17, wherein the polyamide is nylon and the fluoropolymer is polytetrafluoroethylene (PTFE).

19. A vehicle steering assembly for controlling movement of a vehicle having independently rotatable left and right ground-engaging traction elements, the vehicle comprising a control panel within reach of an operator of the vehicle, the control panel comprising a panel support structure for supporting one or more control or display mechanisms of the vehicle, the steering assembly comprising:
- a T-shaped steering handle extending above the panel support structure, wherein the steering handle comprises an upright shaft and a laterally extending crossmember rigidly coupled to the upright shaft;
- a steering controller positioned at least partly below the panel support structure, wherein the upright shaft comprises a base that actuates the steering controller;
- a flexible protective cover extending around and attached to the shaft, wherein the flexible protective cover is configured to prevent dust and debris from entering the controller at the base of the shaft,
- wherein the steering handle is shiftable relative to the panel support structure in forward and rearward directions to thereby cause corresponding forward and rearward rotation of both of the left and right traction elements,
- wherein the steering handle is rotatable relative to the panel support structure in clockwise and counterclockwise directions to thereby cause a change in the relative speeds and directions of rotation of the left and right traction elements, and
- an attachment ring for attaching the flexible protective cover to the shaft,
- wherein the shaft includes a circumferential recess for attaching the flexible protective cover to the shaft, wherein the attachment ring includes an inner portion received in the circumferential recess and an outer portion engaging the flexible protective cover,
- wherein the flexible protective cover includes an upper internal recess, wherein the outer portion of the attachment ring is received in the upper internal recess of the flexible protective cover.

* * * * *